US009829871B1

(12) United States Patent
Goodman et al.

(10) Patent No.: US 9,829,871 B1
(45) Date of Patent: Nov. 28, 2017

(54) DYNAMICALLY PROGRAMMED WATER TIMER

(71) Applicant: Alarm.com Incorporated, Vienna, VA (US)

(72) Inventors: Daniel Goodman, Needham, MA (US); Craig Carl Heffernan, Oregon City, OR (US)

(73) Assignee: Alarm.com Incorporated, Tysons, VA (US)

(*) Notice: Subject to any disclaimer, the term of this patent is extended or adjusted under 35 U.S.C. 154(b) by 619 days.

(21) Appl. No.: 14/447,374

(22) Filed: Jul. 30, 2014

Related U.S. Application Data

(60) Provisional application No. 61/859,824, filed on Jul. 30, 2013.

(51) Int. Cl.
  *G05D 11/00* (2006.01)
  *G05B 19/04* (2006.01)
  *A01G 25/16* (2006.01)
(52) U.S. Cl.
  CPC ......... *G05B 19/041* (2013.01); *A01G 25/167* (2013.01); *G05B 2219/2625* (2013.01)
(58) Field of Classification Search
  None
  See application file for complete search history.

(56) References Cited

U.S. PATENT DOCUMENTS

| | | | | |
|---|---|---|---|---|
| 6,823,239 B2* | 11/2004 | Sieminski | ............ | A01G 25/167 239/69 |
| 8,989,908 B2* | 3/2015 | Marsters | ................ | A01G 25/16 340/10.1 |
| 2012/0239211 A1* | 9/2012 | Walker | ................ | G05B 13/021 700/284 |
| 2014/0343737 A1* | 11/2014 | Nguyen | ................ | A01G 25/16 700/284 |

* cited by examiner

*Primary Examiner* — Diem Cao
(74) *Attorney, Agent, or Firm* — Fish & Richardson P.C.

(57) ABSTRACT

Programmable controller technology, in which data is received that identifies a particular type of irrigation system component that is to be controlled by a programmable controller. Based on receiving the data identifying the particular type of irrigation system component, configuration information is accessed for the particular type of irrigation system component. Based on the configuration information, a configuration is determined for one or more interface ports of the programmable controller. The one or more interface ports of the programmable controller are configured according to the determined configuration. A connection between the particular type of irrigation system component and the programmable controller that satisfies the determined configuration is detected. Based on detecting the connection between the particular type of irrigation system component and the programmable controller that satisfies the determined configuration, the particular type of irrigation system component is controlled through the one or more interface ports.

19 Claims, 7 Drawing Sheets

DYNAMICALLY PROGRAMMED WATER TIMER

CROSS-REFERENCE TO RELATED APPLICATIONS

The present application claims the benefit of U.S. Provisional Application No. 61/859,824, filed Jul. 30, 2014, which is incorporated herein by reference in its entirety for all purposes.

TECHNICAL FIELD

This application relates to a configurable control device.

BACKGROUND

An irrigation system, such as home sprinkler system or other irrigation system, can utilize a control device to allow users of a property associated with the irrigation system to control irrigation of the property grounds. In some cases, different control devices can be compatible with different irrigation system components or a particular number of irrigation system components, such as one or more sprinklers, water valves, hoses, water pumps, or other irrigation system components.

SUMMARY

Techniques are described for the control of an irrigation system associated with a property using a dynamically programmed water timer.

Implementations of the described techniques may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description and the drawings.

DETAILED DESCRIPTION

Techniques are described for providing irrigation control. In some implementations, a control system includes a dynamically programmed water timer and is able to control irrigation at a home, business, vacation, or other property based on the programming of the water timer and data received at the dynamically programmed water timer. The control system utilizes the dynamically programmed water timer to achieve control of water sprinklers and other components associated with the property's irrigation system. By obtaining data relating to environmental conditions, weather forecasts, and activity at the property, the dynamically programmed water timer can control the irrigation system to achieve proper watering of the property. Use of the control system featuring the dynamically programmed water timer can provide improved water usage efficiency and/or improve the convenience of providing proper irrigation.

In some implementations, the control system can include a dynamically programmed water timer that is configurable to operate a number of irrigation system components, for example, one or more sprinklers, hoses, water valves, or other components. The dynamically programmed water timer can include one or more relays or other interface ports that are dynamically configurable to operate a number of different irrigation system components. The dynamically programmed water timer can use processes and data inputs, such as environmental conditions at the property, weather forecasts, water usage data, data identifying water usage restrictions or regulations, activity at the property, and/or user inputs, to control the irrigation system and to provide proper irrigation of the property.

Figure 1A:
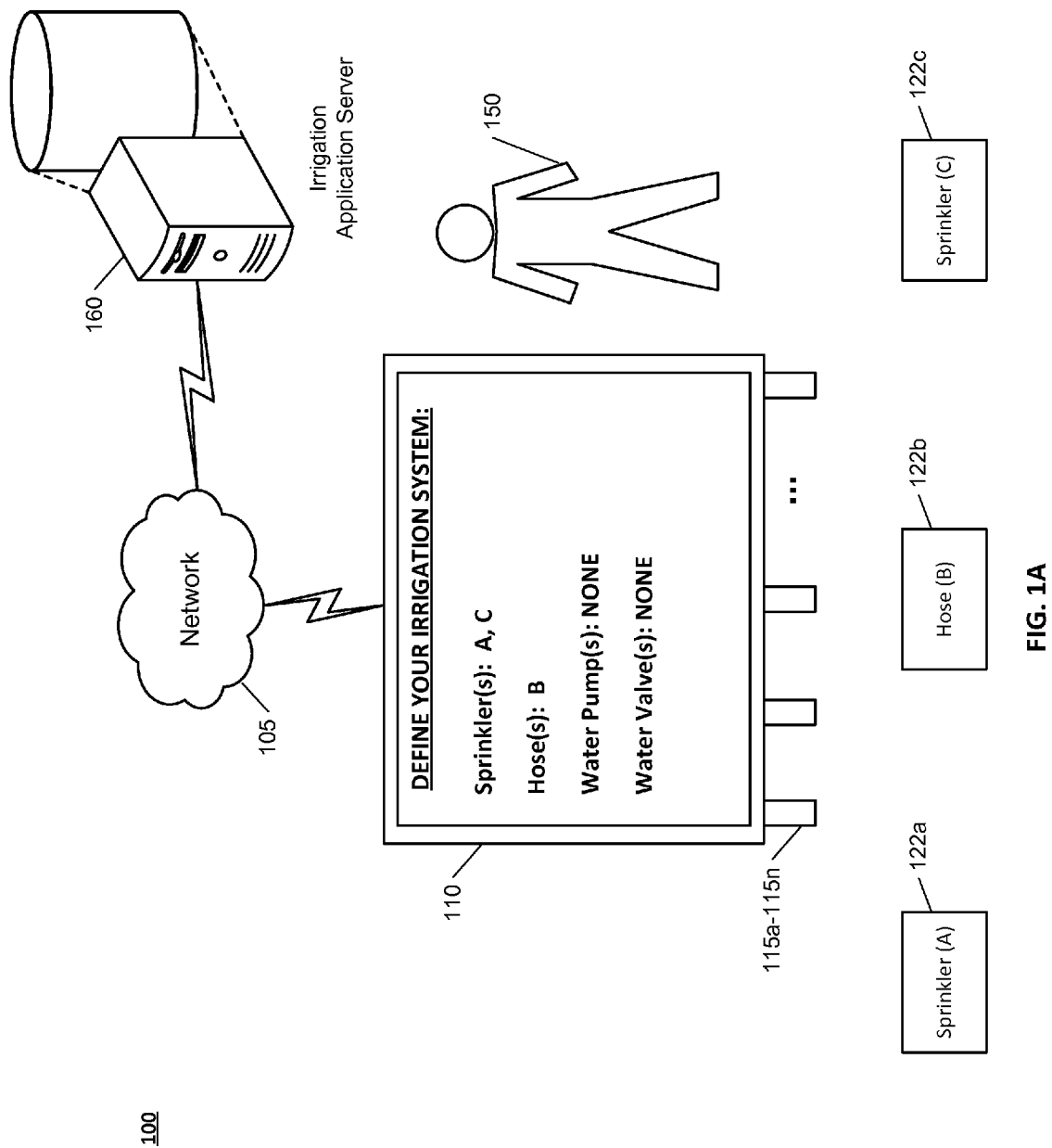
FIGS. 1A-1B illustrate an example of configuring an irrigation system using a dynamically programmed water timer.
Figure 1B:
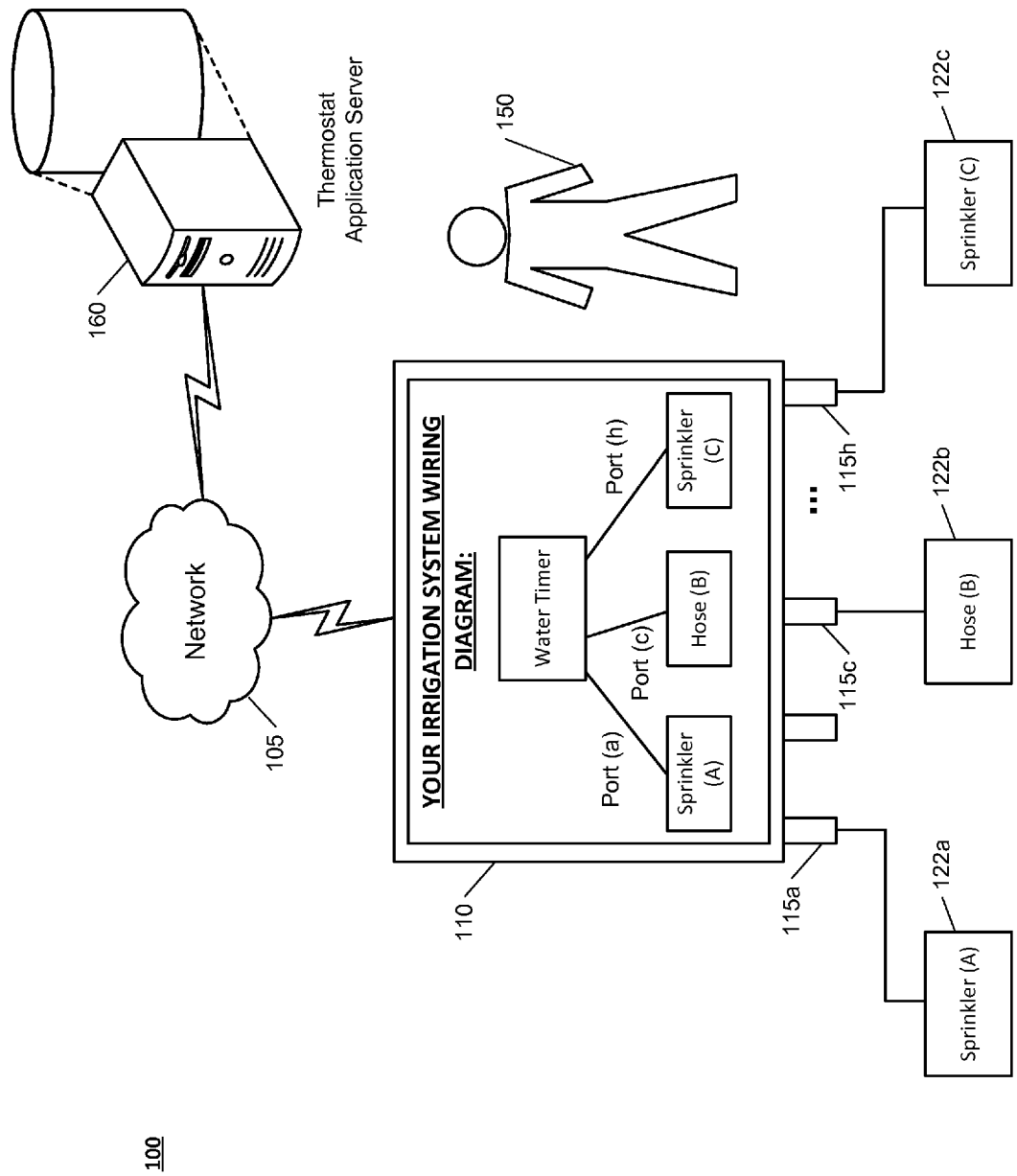

FIGS. 1A and 1B illustrate an example in which a dynamically programmed water timer is used to configure an irrigation system associated with a property. For example, a user of a property may want to configure the dynamically programmed water timer to control one or more irrigation system components that are associated with an irrigation system for a property.

In the example shown in FIG. 1A, an irrigation system 100 features a dynamically programmed water timer 110, an irrigation application server 160, and irrigation system components 122a-122c. The dynamically programmed water timer 110 can communicate with the irrigation application server 160 over a network 105. The dynamically programmed water timer 110 can receive and provide information to the irrigation application server 160 over the network 105, where the information communicated between the dynamically programmed water timer 110 and the irrigation application server 160 relates to the configuration, installation, and/or control of the irrigation system 100 associated with the property. Additionally, dynamically programmed water timer 110 is associated with relays 115a-115n or other interface ports that enable the dynamically programmed water timer 110 to communicate with the one or more irrigation system components 122a-122c.

As shown at FIG. 1A, a user 150 of the irrigation system 100 associated with the property may desire to install and configure the irrigation system 100. The irrigation system 100 to be installed can include a sprinkler 122a associated with an identifier (A), a hose 122b associated with an identifier (B), and a second sprinkler 122c associated with an identifier (C). The identifiers (A), (B), and (C) associated with the irrigation system components 122a-122c can be identifiers that indicate or provide additional information relating to the irrigation system components 122a-122c, such as information that indicates a manufacturer of the irrigation system components 122a-122c, a model of the irrigation system components 122a-122c, or a skew number, part number, version, or other identifier of the irrigation system components 122a-122c.

To enable the configuration and installation of the irrigation system 100, the user 150 may provide information to the dynamically programmed water timer 110 that identifies the irrigation system components 122a-122c. For example, the user 150 may provide information at an interface associated with the dynamically programmed water timer 110 that identifies the irrigation system components 122a-122c. The information provided to the dynamically programmed water timer 110 by the user 150 may be information that indicates that the dynamically programmed water timer 110 should be configured to control each of the sprinkler 122a associated with the identifier (A), the hose 122b associated with the identifier (B), and the sprinkler 122c associated with the identifier (C). In some implementations, the dynamically programmed water timer 110 may be configurable to operate a number of different types of sprinklers, hoses, water valves, water pumps, etc., and the information provided by the user 150 to the dynamically programmed water timer 110 (e.g., the identifier information) can identify the specific types of sprinklers, hoses, water valves, water pumps, etc., that are to be controlled by the dynamically programmed water timer 110. In some implementations, the user 150 can provide information that identifies one or more irrigation system components that are not included and/or not to be controlled by the dynamically programmed water timer 110. For example, as shown in the display of the dynamically programmed water timer 110 at FIG. 1A, the user 150 has provided information to the dynamically programmed water timer 110 that indicates that the dynamically programmed water timer 110 should be configured to control two sprinklers 122a, 122c, associated with the identifiers (A) and (C), that the dynamically programmed water timer 110 should be configured to control the hose 122b associated with the identifier (B), and that the dynamically programmed water timer 110 should not be configured to control a water pump or a water valve.

In some implementations, the dynamically programmed water timer 110 may be able to determine the types of irrigation system components that are connected to the dynamically programmed water timer 110. In such an implementation, the user 150 may be able to connect the irrigation system components 122a-122c to the dynamically programmed water timer 110, and the dynamically programmed water timer 110 may be able to receive and/or exchange information with the irrigation system components 122a-122c to identify the irrigation system components 122a-122c and the identifiers (A), (B), and (C) associated with the irrigation system components 122a-122c, respectively. Thus, in such an implementation, the dynamically programmed water timer 110 may be capable of identifying the irrigation system components 122a-122c without input from the user 150.

Based on receiving and/or accessing the information identifying the irrigation system components 122a-122c, the dynamically programmed water timer 110 can communicate with the irrigation application server 160 to access configuration information for the irrigation system components 122a-122c. For example, the dynamically programmed water timer 110 can transmit information to the irrigation application server 160 that identifies the irrigation system components 122a-122c. Additionally, in some implementations, the dynamically programmed water timer 110 can provide additional information to the irrigation application server 160. For example, the dynamically programmed water timer 110 can provide information to the irrigation application server 160 that identifies the dynamically programmed water timer 110, such as a manufacturer or model associated with the dynamically programmed water timer 110, can provide information to the irrigation application server 160 that identifies the property associated with the irrigation system 100 or attributes of the property associated with the irrigation system 100, can provide information relating to the irrigation system 100, such as the placement of the irrigation system components 122a-122c at the property, or can provide other information to the irrigation application server 160.

The irrigation application server 160 can receive the information identifying the irrigation system components 122a-122c and the other information over the network 105, and based on the received information can access configuration information for the irrigation system components 122a-122c. For example, the irrigation application server 160 can receive the information identifying the irrigation system components 122a-122c and can access configuration information for the irrigation system components 122a-122c. For example, such configuration information may include information relating to the installation of the irrigation system components 122a-122c, information relating to the wiring of the irrigation system components 122a-122c, information relating to the powering of the irrigation system components 122a-122c, information relating to the control (e.g., a control process) of the irrigation system components 122a-122c, or may include other information. In some applications, the irrigation application server 160 may access configuration information for the dynamically programmed water timer 110, such as information indicating the number of and/or types of relays or other interface ports associated with the dynamically programmed water timer 110, information indicating the number of and/or types of irrigation system components that the dynamically programmed water timer 110 can be configured to control (e.g., digital and/or analog irrigation system components), information associated with controlling the irrigation system components 122a-122c using the dynamically programmed water timer 110, or other information.

Based on accessing the configuration information for the irrigation system components 122a-122c and/or the dynamically programmed water timer 110, the irrigation application server 160 can determine a configuration of the irrigation system components 122a-122c and the dynamically programmed water timer 110 such that the irrigation system components 122a-122c are controllable by the dynamically programmed water timer 110. In some implementations, determining such a configuration may include determining a wiring configuration or arrangement for the dynamically programmed water timer 110 and the irrigation system components 122a-122c. Determining the configuration may further involve determining installation instructions for the irrigation system components 122a-122c and/or the dynamically programmed water timer 110, may involve determining a control process for the control of the irrigation system components 122a-122c by the dynamically programmed water timer 110, or may include determining other information relating to the installation, configuration, and control of the irrigation system components by the dynamically programmed water timer 110. Based on determining the configuration for the dynamically programmed water timer 110 and the irrigation system components 122a-122c, the irrigation application server 160 can transmit information to the dynamically programmed water timer 110 that includes or defines the configuration of the irrigation system 100.

In some implementations, the irrigation application server 160 can access the configuration information for the irrigation system components 122a-122c, the dynamically programmed water timer 110, and/or the other information, and can transmit the information to the dynamically programmed water timer 110. The dynamically programmed water timer 110 can receive the information from the irrigation application server 160 over the network 105, and can determine the configuration for the irrigation system 100 based on the received data.

At FIG. 1B, based on the dynamically programmed water timer 110 receiving the information defining the configuration of the irrigation system 100, the dynamically programmed water timer 110 can be configured according to the determined configuration. The dynamically programmed water timer 110 can configure one or more of the relays 115a-115n associated with the dynamically programmed water timer 110 to accommodate the determined configuration, for example, to be able to connect with and control the irrigation system components 122a-122c. The dynamically programmed water timer 110 may also load, store, and/or initialize a control process associated with controlling the irrigation system components 122a-122c.

In addition, as shown at FIG. 1B, the dynamically programmed water timer 110 may output information at a display associated with the dynamically programmed water timer 110 that includes information relating to the configuration of the irrigation system 100. For example, the dynamically programmed water timer 110 may receive the information defining the determined configuration for the irrigation system 100, and may generate one or more graphics that include the information for output at the display associated with the dynamically programmed water timer 110. In some examples, the graphics generated by the dynamically programmed water timer 110 and output at the display of the dynamically programmed water timer 110 can include one or more wiring diagrams indicating how the irrigation system components 122a-122c should be connected to the dynamically programmed water timer 110, installation instructions for an installation process of the components of the irrigation system 100, information specifying a control process or control process parameters used by the dynamically programmed water timer 110 to control the irrigation system components, or other information that can facilitate installation and configuration of the irrigation system 100 by the user 150.

The user 150 associated with the irrigation system 100 can utilize the displayed information to complete the installation of the irrigation system 100, for example, to complete the installation of the dynamically programmed water timer 110 and the irrigation system components 122a-122c. For example, as shown at FIG. 1B, the user 150 may be presented with a wiring diagram for the dynamically programmed water timer 110 and the irrigation system components 122a-122c such that the user 150 can connect the irrigation system components 122a-122c and the dynamically programmed water timer 110 according to the determined wiring arrangement.

Based on the dynamically programmed water timer 110 being configured according to the determined configuration and the user 150 having completed the installation of the irrigation system 100, the dynamically programmed water timer 110 can control the irrigation system components 122a-122c. For example, the dynamically programmed water timer 110 can control the irrigation system components 122a-122c according to one or more control processes determined by and received from the irrigation application server 160, or according to one or more control processes determined by or accessible to the dynamically programmed water timer 110. In some instances, the dynamically programmed water timer 110 may be able to access such control processes locally, for example, at a data storage component associated with the dynamically programmed water timer 110, may be able to modify a control process, or may be able to otherwise access a control process used to control the irrigation system components 122a-122c. In some implementations, the dynamically programmed water timer 110 can determine when the irrigation system components 122a-122c have been connected to the dynamically programmed water timer 110 in a manner that is consistent with the determined configuration, and, based on determining that the irrigation system components 122a-122c have been connected to the dynamically programmed water timer 110 according to the determined configuration, can proceed to control the irrigation system components 122a-122c.

Figure 2:
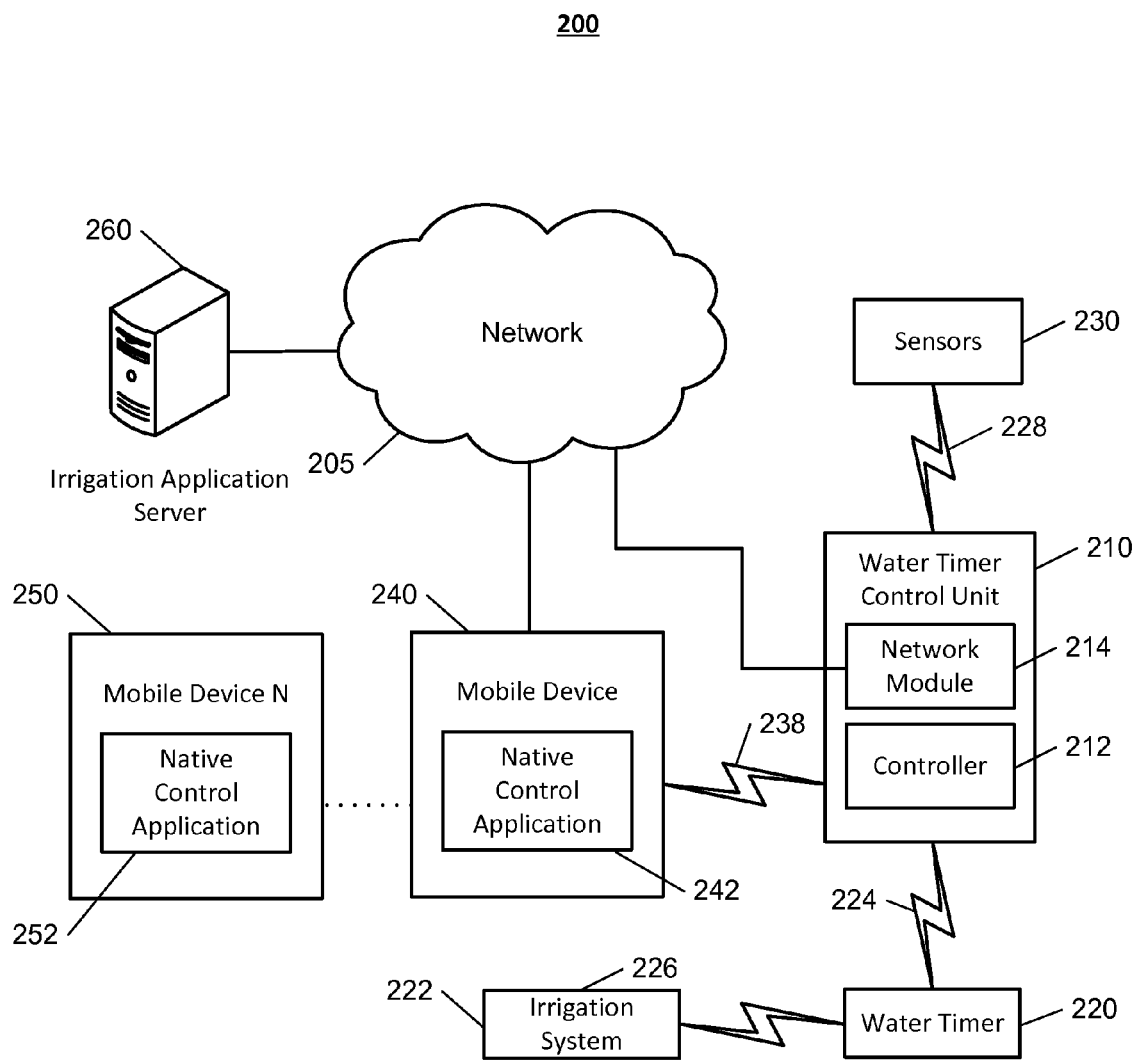
FIG. 2 illustrates an example system capable of enabling the configuration and control of an irrigation system using a dynamically programmed water timer.

FIG. 2 illustrates an example of a control system 200 featuring a dynamically programmed water timer used to operate an irrigation system associated with a property. The control system 200 includes a network 205, a water timer control unit 210, one or more mobile devices 240, 250, and an irrigation application server 260.

The network 205 is configured to enable electronic communications between devices connected to the network 205. For example, the network 205 can be configured to enable exchange of electronic communications between the water timer control unit 210, the one or more mobile devices 240, 250, and the irrigation application server 260.

The network 205 can include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. The network 205 can include multiple networks or subnetworks, each of which can include, for example, a wired or wireless data pathway. The network 205 can include a circuit-switched network, a packet-switched data network, or any other network capable of carrying electronic communications, e.g., data or voice communications. For example, the network 205 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 205 can include one or more networks that include wireless data channels and wireless voice channels. The network 205 can be a wireless network, a broadband network, or a combination of networks including a wireless network and a broadband network.

The water timer control unit 210 is configured to control the dynamically programmed water timer 220 and includes a controller 212 and a network module 214. The controller 212 is configured to control a system that includes the water timer control unit 210, e.g., a system for controlling a dynamically programmed water timer 220 associated with a property's irrigation system. In some examples, the controller 212 can include a processor or other control circuitry configured to execute instructions of a program that controls operation of the dynamically programmed water timer 220. In some examples, the controller 212 is configured to receive inputs from sensors, detectors, one or more servers, or other devices associated with the system and to control operation of the dynamically programmed water timer 220 that is associated with the property's irrigation system. In some instances, the controller 212 is configured to control the network module 214 included in the water timer control unit 210.

The network module 214 is a communication device configured to exchange communications over one or more networks 205. The network module 214 can be a wireless communication device configured to exchange wireless communications over the network 205. For example, the network module 214 can be a wireless communication device configured to exchange communications over a wireless data channel. In such an example, the network module 214 can transmit data relating to identified components of the property's irrigation system, data associated with control processes used by the dynamically programmed water timer 220 to control the property's irrigation system, environmental data associated with the property, weather forecast data, water usage data, data identifying water usage restrictions or regulations, activity at the property, and/or user inputs such as those input by users at mobile devices 240, 250. The wireless communication device can include one or more GSM modules, a radio model, a cellular transmission module, or any type of module configured to exchange communications in one of the following formats: GSM or GPRS, CDMA, EDGE or EGPRS, EV-DO or EVDO, UMTS, or IP.

In some implementations, the network module 214 is a wired communication module configured to exchange communications over the network 205 using a wired connection. For instance, the network module 214 can be a modem, a network interface card, or another type of network interface device. The network module 214 can be an Ethernet network card configured to enable the water timer control unit 210 to communicate over a local area network and/or over the Internet. The network module 214 can also be a voiceband modem configured to enable the water timer control unit to communicate over the telephone lines of Plain Old Telephone Systems (POTS).

The water timer control unit 210 associated with the control system communicates with sensors associated with a module 230 and a dynamically programmed water timer 220 to provide control of an irrigation system associated with a property. The module 230 is associated with one or more sensors configured to monitor the environment at the property at various locations, e.g., at various outdoor locations at the property, and can also be configured to monitor activity at the property. For example, the module 230 can be associated with one or more environmental sensors, such as temperature sensors, humidity sensors, light sensors, air quality sensors, wind sensors, water sensors, rain sensors, ground water sensors, barometric pressure sensors, etc., and/or can be associated with one or more activity sensors, for example, one or more motion sensors, contact sensors, noise sensors, knock sensors, etc. The module 230 associated with the one or more sensors can communicate outputs of the sensors to the water timer control unit 210. For example, the module 230 can transmit sensor data to the water timer control unit 210 that indicates environmental conditions at various outdoor locations of the property, e.g., a temperature, humidity, ground water measurement, and light measurement at numerous outdoor locations of the property, and activity at the property, e.g., whether there are any individuals present at the property or whether any individuals are present outdoors on the property's grounds.

The dynamically programmed water timer 220 is configured to enable the dynamically programmed water timer 220 to control operation of a property's irrigation system. In some instances, data identifying and/or including one or more operating processes used by the dynamically programmed water timer 220 to control the property's irrigation system can be received at the dynamically programmed water timer 220. Additionally or alternatively, the dynamically programmed water timer 220 can send and/or receive information relating to components of the irrigation system that are associated with the dynamically programmed water timer 220. For example, the water timer 220 can send and/or receive connectivity data to one or more controllers of irrigation system sprinkler heads, or data identifying commands sent to the one or more controllers associated with the sprinkler heads. In some implementations, the dynamically programmed water timer 220 can additionally or alternatively receive data relating to environmental conditions at the property, e.g., at various outdoor locations of the property, can receive data identifying weather forecasts for the geographic region of the property, can receive data relating to activity at the property, and/or can receive data relating to user inputs associated with the controller of the property's irrigation system. In some implementations, the dynamically programmed water timer 220 can directly measure water and/or energy usage by the irrigation system associated with the dynamically programmed water timer 220, or can estimate water and/or energy usage by the irrigation system. The dynamically programmed water timer 220 can communicate data related to controlling components of the property's irrigation system associated with the module 222, for example, by communicating data related to controlling the irrigation system components that is received from the water timer control unit 210.

In some implementations, the dynamically programmed water timer 220 can be integrated with the water timer control unit 210. For example, the dynamically programmed water timer 220 can include the water timer control unit 210, e.g., as an internal component to the dynamically programmed water timer 220. In some implementations, the water timer control unit 210 can be a gateway device that communicates with the dynamically programmed water timer 220.

The module 222 is connected to one or more components of an irrigation system associated with the property and is configured to control the operation of the one or more components of the irrigation system. In some implementations, the module 222 is also configured to monitor water and/or energy usage of the irrigation system components, for example, by directly or indirectly measuring the water and/or energy usage of the one or more irrigation system components, or by estimating the water and/or energy usage of the one or more irrigation system components. In some implementations, the module 222 is configured to send and/or receive information identifying a state of the one or more components of the irrigation system. In some implementations, the module 222 is configured to send and/or receive information identifying control commands for one or more of the irrigation system components, such as control commands indicating an on/off state, a time period to operate, etc. The module 222 can communicate water monitoring information, energy monitoring information, and/or data identifying the state of the irrigation system components to the dynamically programmed water timer 220, and can control operation of the irrigation system components based on control commands received from the dynamically programmed water timer 220.

The dynamically programmed water timer 220 and the module 230 can communicate with the controller 212 over communication links 224 and 228, and the module 222 can communicate with the dynamically programmed water timer 220 over communication link 226. The communication links 224, 226, and 228 can be wired or wireless data pathways configured to transmit signals from the dynamically programmed water timer 220 and the module 230 to the controller 212, and from the module 222 to the dynamically programmed water timer 220. The dynamically programmed water timer 220 and the modules 222 and 230 can continuously transmit information, can periodically transmit information, or can transmit information in response to a change in sensed values at the sensors associated with module 230, operating conditions or operating processes associated with the dynamically programmed water timer 220, connections to the irrigation system components associated with module 230, etc.

In some implementations, connections through communications links 224, 226, and 228 can use one or more short-range wireless technologies, such as Bluetooth, Wi-Fi, near field communication (NFC) technologies, ZigBee, Z-Wave, dedicated short-range communication (DSRC) technologies, or other short-range wireless technologies. In some examples, the communication links 224, 226, and 228 can utilize wired connections such as one or more Ethernet connections, HomePlug (Ethernet over powerline) or other powerline connections, universal serial bus (USB) connections, wired connections using wired protocols based on the RS232, RS485, and/or RS422 standards, or other wired connections. In some instances, the communication links 224, 226, and 228 can communicate over one or more networks, such as one or more local area networks (LAN) or wide area networks (WAN), such as the Internet.

In some implementations, the module 222 associated with one or more components of an irrigation system can communicate directly with the water timer control unit 210. For example, the water timer control unit 210 can communicate with the module 222 to send and/or receive information related to controlling components of the irrigation system, information relating to water and/or energy usage of the irrigation system components, or other information. In some instances, the dynamically programmed water timer 220 can communicate information to the water timer control unit 210, and the water timer control unit 210 can communicate the information received from the dynamically programmed water timer 220 to the module 222 associated with the one or more irrigation system components.

The irrigation application server 260 is an electronic device configured to provide control services by exchanging electronic communications with the water timer control unit 210 and the one or more mobile devices 240, 250 over the one or more networks 205. For example, the irrigation application server 260 can be configured to monitor data obtained by the water timer control unit 210. In this example, the irrigation application server 260 can exchange electronic communications with the network module 214 associated with the water timer control unit 210 to send and/or receive information relating to irrigation system components configured to operate with the dynamically programmed water timer 220, operating processes relating to the property's irrigation system, information regarding the environment at the property, and/or weather forecast data for the geographic region of the property. In some implementations, the irrigation application server 260 can also send and receive information relating to the operation of the property's irrigation system from the one or more mobile devices 240, 250. For example, the irrigation application server 260 can send and/or receive information from the one or more mobile devices 240, 250 indicating updates to operating processes related to the property's irrigation system, or can enable access or monitoring of the operation of the property's irrigation system by a professional installer, a technician, or a user of the property.

In some implementations, the irrigation application server 260 can have access to weather data and/or weather forecast data for the geographic region of the property, and the weather data and/or weather forecast data can be used in determining control of the irrigation system associated with the property. For example, the irrigation application server 260 can have a connection to the Internet over one or more networks 205 and can access weather data and/or weather forecast data at a website or database that is accessible on the Internet. The weather data can include current weather data for the geographic region of the property, such as a current temperature, humidity, due point, wind chill, heat index, barometric pressure, etc., and weather forecast data can include short and long term weather forecasts, for example, short and long term precipitation forecasts, temperature forecasts, cloud cover forecasts, etc.

The irrigation application server 260 can store data, e.g., data relating to connections of the control system to components of the irrigation system, irrigation system operating processes, weather data, weather forecast data, activity data, etc. In some instances, the irrigation application server 260 can receive the stored data from the water timer control unit 210, the mobile devices 240, 250, and/or over the Internet, and can perform analysis of the stored data. Based on the analysis, the irrigation application server 260 can communicate with the water timer control unit 210, for example, to provide connectivity information relating to the components of the property's irrigation system, irrigation system operating processes, or other information relating to the operation of the irrigation system associated with the property.

The one or more mobile devices 240, 250 are devices that host one or more native applications, e.g., the native control applications 242, 252. The one or more mobile devices 240, 250 can be cellular phones or non-cellular locally networked devices. The one or more mobile devices 240, 250 can include a cell phone, a smart phone, a tablet computer, a personal digital assistant ("PDA"), a laptop computer, desktop computer, or any other device configured to communicate over a network. For example, implementations can also include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 240, 250 can be the same or can include mobile devices of different types. The one or more mobile devices 240, 250 can perform functions unrelated to the control system, such as placing personal telephone calls, playing music, playing video, displaying pictures, browsing the Internet, maintaining an electronic calendar, etc.

In some implementations, the one or more mobile devices 240, 250 communicate with and receive control system data from the water timer control unit 210 using the communication link 238. For instance, the one or more mobile devices 240, 250 can communicate with the water timer control unit 210 using various local wireless protocols, such as Wi-Fi, Bluetooth, Z-Wave, ZigBee, HomePlug (Ethernet over powerline), or wired protocols such as Ethernet, USB, and other wired protocols based on the RS232, RS485, and/or RS422 standards. In some instances, the one or more mobile devices 240, 250 can connect locally to the control system and its sensors and other devices. The local connection can improve the speed of communications because communicating through the network 205 with a remote server, e.g., the control application server 260, can be slower.

Although the one or more mobile devices 240, 250 are shown communicating with the water timer control unit 210, in some implementations, the one or more mobile devices 240, 250 can communicate directly with the sensors and other devices associated with the water timer control unit 210. In some implementations, the one or more mobile devices 240, 250 replace the water timer control unit 210 and perform the functions of the water timer control unit 210 for local control and long range or offsite communication.

In other implementations, the one or more mobile devices 240, 250 receive control system data from the water timer control unit 210 through the network 205. The one or more mobile devices 240, 250 can receive the data from the water timer control unit 210 through the network 205 or the irrigation application server 260 and can relay data received from the water timer control unit 210 to the one or more mobile devices 240, 250 through the network 205. In this regard, the irrigation application server 260 can facilitate communications between the one or more mobile devices 240, 250 and the water timer control unit 210.

Although the one or more mobile devices 240, 250 are shown in FIG. 1 as being connected to the network 205, in some implementations, the one or more mobile devices 240, 250 are not connected to the network 205. In these implementations, the one or more mobile devices 240, 250 can communicate directly with one or more of the components of control system 200 and no network connection, e.g., connection to the Internet, or reliance on remote servers is needed.

In some implementations, the one or more mobile devices 240, 250 are used in conjunction with only the sensors, the components of the irrigation system associated with the property, and the dynamically programmed water timer 220. In these instances, the control system 200 only includes the one or more mobile devices 240, 250, the dynamically programmed water timer 220, and the modules 222 and 230 associated with the irrigation system components and the sensors, respectively. The one or more mobile devices 240, 250 can receive data directly from the dynamically programmed water timer 220 and the modules 222 and 230, and can send data directly to the dynamically programmed water timer 220 and the modules 222 and 230. The one or more mobile devices 240, 250 can provide the appropriate interfaces and/or processing to provide control information, modify settings and/or processes, set or control the dynamically programmed water timer 220, control the components of the irrigation system associated with the property, etc. In some instances, the mobile devices 240, 250 can communicate with the dynamically programmed water timer 220 and the modules 222 and 230 over one or more networks such that the control system 200 includes the one or more networks 205.

The one or more mobile devices 240, 250 can each include a native control application 242, 252, respectively. The native control application 242, 252 refers to a software or firmware program running on the corresponding mobile devices that enables features described below. The one or more mobile devices 240, 250 can load or install the native control application 242, 252 based on data received over one or more networks 205, or based on data received from local media. The native monitoring application 242, 252 can run on operating platforms associated with the mobile devices 240, 250, such as Apple iOS, iPhone, iPod touch, Blackberry, Google Android, Windows Mobile, etc.

The control system 200 can include a water timer that can be dynamically programmed to control various irrigation system configurations and components of irrigation systems.

The dynamically programmed water timer 220 can be configured to operate a number of different irrigation system components, including one or more sprinklers, sprinkler controllers, water valves, and other components of an irrigation system. For example, the dynamically programmed water timer 220 can be configured to operate an irrigation system for a lawn and garden associated with a property that includes a number of different sprinklers for watering various locations of the property, and the dynamically programmed water timer 220 can control operation of the sprinklers and supporting components of the sprinkler system, e.g., water valves and controllers for the sprinklers.

In some implementations, the dynamically programmed water timer 220 can have capabilities to operate particular portions of the irrigation system associated with the property. For example, the dynamically programmed water timer 220 can activate one or more particular portions of the irrigation system to provide irrigation to one or more particular areas of a property's grounds, and can control the irrigation system to not activate one or more particular other portions of the irrigation system associated with one or more particular other portions of the property's grounds. For example, the dynamically programmed water timer 220 can activate one or more sprinklers located in a back yard of a home to provide irrigation to a lawn and garden in the back yard of the home, while not activating one or more sprinklers located in the front yard of the home.

In some implementations, the dynamically programmed water timer 220 can receive and/or store one or more processes associated with operating an irrigation system of a property. For example, the dynamically programmed water timer 220 can receive one or more processes from the water timer control unit 210 and can store the one or more processes. In some instances, the dynamically programmed water timer 220 can store information associated with one or more processes locally at the dynamically programmed water timer 220, for example, at a memory or other computer readable storage associated with the dynamically programmed water timer 220. In some implementations, the dynamically programmed water timer 220 receives processes over one or more networks 205, for example, from the irrigation application server 260 or from one or more mobile devices 240, 250. In some instances, the dynamically programmed water timer 220 receives the one or more processes obtained over one or more networks 205 from the water timer control unit 210, can receive the one or more processes directly from the source of the processes over the one or more networks 205, e.g., through a direct network connection to the irrigation application server 260 or one or more mobile devices 240, 250, and/or can receive the one or more processes through a local connection, e.g., through an Ethernet, USB, Bluetooth, or other connection, to one or more mobile devices 240, 250.

The dynamically programmed water timer 220 can have capabilities to execute processes received at the dynamically programmed water timer 220. For example, the dynamically programmed water timer 220 can have a processor that is capable of executing operations based processes received at the dynamically programmed water timer 220. In some instances, executing operations based on processes can involve controlling one or more components of the irrigation system associated with the property based on the processes.

In some implementations, the dynamically programmed water timer 220 can have a mechanism to update one or more processes associated with operation of an irrigation system. For example, the dynamically programmed water timer 220 can regularly update one or more processes used to control the irrigation system based on the passage of a predetermined period of time, e.g., the processes are updated every three months, based on determining that more recent processes are available, e.g., that updated processes are available at the irrigation application server 260 or at the one or more mobile devices 240, 250, based on receiving updated processes from one or more sources, e.g., based on receiving one or more updated processes sent from the irrigation application server 260 and/or the one or more mobile devices 240, 250, or based on user inputs requesting an update of the one or more operating processes, e.g., based on inputs from users at an interface of the dynamically programmed water timer 220 and/or based on inputs from users using one or more mobile devices 240, 250. In some instances, the dynamically programmed water timer 220 can store the updated processes in addition to previously implemented processes, and/or can overwrite previous processes.

The dynamically programmed water timer 220 can operate an irrigation system based on processes or updated processes received and/or stored at the dynamically programmed water timer 220, at the water timer control unit 210 or a component associated with the water timer control unit 210, or at another component associated with the control system 200. For example, a process can include a set of controller constant values that can be related to a proportional-integral-derivative (PID) controller, and the dynamically programmed water timer 220 can operate the irrigation system based on the controller constant values associated with the PID controller. For example, operating an irrigation system based on a PID control process can include obtaining data from one or more sensors, such as one or more sensors associated with the module 230, and controlling the irrigation system based on the data obtained from the one or more sensors and the controller constant values. In other implementations, a process or updated process used by the dynamically programmed water timer 220 can include a set of rules or code, and the dynamically programmed water timer 220 can control the irrigation system based on the received rules or code. In some instances, receiving a new process can include updating, replacing, and/or augmenting a set of controller constant values, a set of rules, and/or code used to control the irrigation system by the dynamically programmed water timer 220.

In some instances, the dynamically programmed water timer 220 can operate an irrigation system associated with a property to provide irrigation to the property based on a schedule that indicates one or more particular times of day, one or more days of the week or day schedule, and/or can provide irrigation to the property for a particular amount of time over the course of a day or other time period. For example, a home having an irrigation system for providing irrigation to a lawn and garden of the home can have a dynamically programmed water timer 220 that operates the irrigation system to water the lawn and garden of the home based on a particular time schedule. For example, the dynamically programmed water timer 220 can operate the irrigation system to water the lawn and garden every day between the times of 5:00 AM and 5:30 AM and again between 8:00 PM and 8:30 PM. In other examples, the dynamically programmed water timer 220 can operate the irrigation system to water the lawn and garden every other day for a particular period of time or set of times, or only on certain days for a particular period of time or set of times. For example, the irrigation system can be operated to water the lawn and garden of a home every Monday through Friday for a total of one hour each day, can be operated to water the lawn every other day between the times of 5:00 AM and 5:30 AM and again between 8:00 PM and 8:30 PM, or can be operated to water the lawn and garden on any other days, times, or periods of times.

In some instances, data obtained from environmental sensors at various locations of a property can be used to determine operation of an irrigation system associated with the property. In some instances, data from environmental sensors at the property can be used in conjunction with schedules for irrigation of the property. Environmental sensor data can include any data obtained from environmental sensors associated with the module 230, such as data obtained from one or more temperature sensors, humidity sensors, light sensors, air quality sensors, wind sensors, water sensors, rain sensors, ground water sensors, barometric pressure sensors, etc.

For example, based on data obtained from a ground water sensor indicating that soil at the property, or at one or more particular locations of the property, is dry, the dynamically programmed water timer 220 can operate the irrigation system to irrigate the property or particular locations of the property. In another example, based on determining that the temperature at the property is above a certain threshold, that it is sunny based on information from a light sensor, and/or other data received from environmental sensors associated with the irrigation system, the dynamically programmed water timer 220 can determine not to irrigate the property to avoid watering the property at a time that would result in inefficient water usage, or can delay watering the property until a later time.

In some implementations, data obtained from environmental sensors associated with a property can be used to identify one or more zones of the property having various characteristics, and the dynamically programmed water timer 220 can provide irrigation of the property based on information identifying the one or more zones. For example, data received from one or more ground water sensors can indicate particular zones of a property's grounds that are generally drier or moister than other zones of the property. For example, a particular zone of a property may be generally more dry than other zones based on the particular zone being located in a particularly sunny area of the property, or a particular zone may be generally more moist than other zones based on the zone being located near a gutter downspout or in a low-lying area of the property. In another example, a zone may be identified as a particularly sunny or shady zone of the property based on data obtained from light sensors in the particular zones.

In some instances, the dynamically programmed water timer 220 can irrigate particular zones of the property differently based on the zones being identified as having a particular characteristic. For example, the dynamically programmed water timer 220 can determine to provide additional irrigation to a dry or sunny zone, or provide less irrigation to a moist or shady zone. In some instances, information identifying one or more zones of the property as having particular characteristics can be used to intelligently update a process associated with providing irrigation to the property. For example, data indicating characteristics of one or more zones of a property can be used to perform machine learning or intelligent updating of a process that is used by the dynamically programmed water timer 220 in providing irrigation of a property.

In some instances, the dynamically programmed water timer 220 can operate the irrigation system associated with the property based on a combination of environmental sensor data and data indicating scheduled times that the irrigation system is preferably active. For example, an irrigation system can be scheduled to water a lawn and garden of a home every day at 5:00 AM, but based data from the environmental sensors indicating that it is currently raining at the property, the dynamically programmed water timer 220 can determine to forgo activating the irrigation system, e.g., for that day, for a predetermined period of time, or until data from the environmental sensors indicates that it is no longer raining at the property.

In some implementations, data obtained from activity sensors at the property can be used by the dynamically programmed water timer 220 to determine operation of the irrigation system. For example, activity data received from motion sensors at various locations of a home can indicate that one or more residents of the home are outdoors on the grounds of the home, e.g., near a lawn or garden of the home, and based on determining that the one or more residents of the home are outdoors on the grounds of the home, the dynamically programmed water timer 220 can determine not to activate the irrigation system associated with the home. In some implementations, data obtained from the activity sensors can enable the dynamically programmed water timer 220 to deactivate an irrigation system based on activity detected at a property. For example, if an irrigation system is actively irrigating a home and detects a vehicle pulling into a driveway of the home, the dynamically programmed water timer 220 can determine to deactivate the irrigation system to avoid spraying residents of the home with water when they exit the vehicle. In some instances, data obtained from the activity sensors can enable the dynamically programmed water timer 220 to activate or deactivate portions of an irrigation system. For example, based on determining that residents of a home are occupying a back yard of a home, the dynamically programmed water timer 220 can determine to deactivate a portion of the home's irrigation system corresponding to the back yard of the home, and can determine to activate or continue to keep active portions of the irrigation system responsible for watering the front yard of the home. Based on determining that the residents of the home have moved, e.g., gone inside or moved to another part of the home's grounds, the dynamically programmed water timer 220 can activate the portions of the irrigation system associated with the back yard of the home.

In some instances, the dynamically programmed water timer 220 can operate an irrigation system associated with a property based on a combination of data received from one or more environmental sensors at the property, activity sensors at the property, and/or timing schedules associated with irrigating the property. For example, based on determining that a property's grounds are scheduled to be watered at 8:00 PM, but that the grounds are occupied by users of the property at that time, the dynamically programmed water timer 220 can determine to bypass activating the irrigation system at 8:00 PM until the next scheduled time for the irrigation system to be occupied, e.g., at 5:00 AM the next morning, or until activity sensors at the property indicate that the grounds of the property are no longer occupied. In another example, activity sensors associated with the property grounds may determine that users of the property are currently occupying the property, but based on environmental sensor data indicating that the soil of the property is extremely dry, the dynamically programmed water timer 220 can determine to activate the irrigation system associated with the property despite the property grounds being occupied.

In some implementations, activity data obtained from one or more activity sensors located at a property can be used to identify activity patterns associated with the property. The dynamically programmed water timer 220 can perform irrigation of the property based on the identified activity patterns and/or can use the identified activity patterns to update processes associated with irrigating the property. For example, based on activity data at a property identifying recurring periods of time when the residents of the property are likely to be sleeping, e.g., based on activity data from sensors located inside of the property indicating that all of the residents of the property are located in bedrooms of the property, an activity pattern can be identified indicating hours of the day when the residents of the property are asleep, and the dynamically programmed water timer 220 can determine not to activate an irrigation system associated with the property during these times. In some instances, information from identified activity patterns can be used to update processes associated with performing irrigation of the property. For example, the activity patterns can be used to perform machine learning or intelligent updating of the processes associated with performing irrigation.

In some implementations, activity data obtained from sensors located at various locations of a property can be used to determine high and/or low foot traffic regions of the property, and the dynamically programmed water timer 220 can determine to irrigate specific portions of the property differently based on the location being a high or low foot traffic region. For example, activity data can indicate that a particular portion of a property's grounds has generally high foot traffic, i.e., a greater number of people walking over the grounds in that location as compared to other locations of the property's grounds, and the dynamically programmed water timer 220 can increase or decrease the amount of irrigation for that particular portion of the property grounds based on the determination that the particular portion of the property grounds is subject to high foot traffic.

In other examples, the dynamically programmed water timer 220 can determine times of day or days of the week when particular portions of a property's grounds are subject to increased or decreased foot traffic, and can operate the property's irrigation system based on the determination. For example, based on data received from activity sensors at the property, the dynamically programmed water timer 220 can determine that particular portions of the property's grounds are subject to high foot traffic during a particular time of day, or only on certain days, and can schedule irrigation of those portions of the grounds so as to avoid interfering with those particular times or days. For example, activity data can identify that a garden of a home has increased activity on Monday through Friday from 6:00 PM to 8:00 PM, and on Saturday and Sunday from 10:00 AM to 3:00 PM, and the dynamically programmed water timer 220 can determine to irrigate the garden of the home at times that do not coincide with these periods of time.

In some examples, activity data can be used to determine that users of a property are away from the property for an extended period of time, and the dynamically programmed water timer 220 can control an irrigation system associated with the property based on determining that the users of the property are away from the property for an extended period. For example, based on activity sensor data from the property indicating that no activity has occurred for a particular period of time, e.g., one or more days, the control system can determine that users of the property may be on vacation, that it may be a weekend or holiday, etc., and the dynamically programmed water timer 220 can operate the irrigation system associated with the property based on the determination. In some examples, operating the irrigation system based on determining that users of the property are away from the property for an extended period of time can include adjusting times when the property is irrigated, an amount of time that the property is irrigated over the course of the period or per each irrigation period, etc. For example, the dynamically programmed water timer 220 can reduce the frequency of irrigation of the property based on determining that the users of the property may be on vacation. In some implementations, the dynamically programmed water timer 220 can use a first process associated with irrigating the property when the property is occupied, e.g., a "normal" mode of operation, can use a second, different process associated with irrigating the property when the property is not occupied, e.g., a "vacation" mode of operation, and can operate the irrigation system using one of the processes based on determining whether users of the property are away from the property for an extended period of time.

In some instances, location data obtained from the one or more mobile devices 240, 250 can be received by the control system 200, and an irrigation system associated with a property can be controlled based on the location data obtained from the one or more mobile devices 240, 250. In some implementations, information identifying a geographic location of mobile devices 240, 250 can be achieved by using global positioning system (GPS) capabilities associated with the mobile devices 240, 250, or based on other methods, such as by using Wi-Fi access point triangulation data, cellular network triangulation data, or IP address information, when the mobile devices 240, 250 have network connectivity. The mobile devices 240, 250 can transmit data identifying the geographic location of the mobile devices 240, 250 over the network 205 to the irrigation application server 260, to the water timer control unit 210, to the dynamically programmed water timer 220, or to another destination.

Based on the location data received from the one or more mobile devices 240, 250, the dynamically programmed water timer 220 can control an irrigation system associated with a property. For example, location data from mobile devices 240, 250 can indicate that residents of the property have all left the property and are moving away from the property, e.g., driving to work or to school, and the dynamically programmed water timer 220 can activate the irrigation system of the property based on determining that all of the residents of the property are leaving the property. In another example, an irrigation schedule used by the dynamically programmed water timer 220 can indicate a scheduled time of irrigation as beginning within a half hour, however, based on location data from one or more mobile devices 240, 250 indicating that residents of the property are currently returning to the property, e.g., have left work or school and are returning home, the dynamically programmed water timer 220 can determine to begin watering the property ahead of the scheduled time to avoid watering the property after the residents have arrived home.

In some instances, the dynamically programmed water timer 220 can obtain current weather data for a geographic region of a property and can operate an irrigation system associated with the property based on the current weather data. Current weather data can include reports of weather accessed at, for example, the irrigation application server 260, or elsewhere over one or more networks 205, for example at a website or database accessible on the Internet. Current weather data can include data indicating the weather at a particular given time in the geographic region of the property, for example, a current temperature, humidity, cloud cover, precipitation, wind speed and direction, barometric pressure, heat index, wind chill, dew point, etc. In some instances, the dynamically programmed water timer 220 can operate the irrigation system associated with the property based on the received weather data.

For example, based on current weather data indicating that it is currently raining in the geographic region of a property, the dynamically programmed water timer 220 can determine not to activate an irrigation system associated with the property, or can determine to delay activating the irrigation system until it has stopped raining. In other examples, the dynamically programmed water timer 220 can determine to delay activating the irrigation system based on a current temperature being within a threshold of a dew point, based on a barometric pressure being below a threshold indicating that a storm is likely, or based on other metrics related to current weather data. In some examples, the dynamically programmed water timer 220 can determine to activate an irrigation system associated with a property based on the current weather data indicating that a temperature is sufficiently above a current dew point, that the barometric pressure it above a threshold pressure, that there is no current precipitation, etc.

In some instances, the dynamically programmed water timer 220 can operate an irrigation system associated with a property based on weather forecast data for the geographic region of the property. Weather forecast data can include reports of weather accessed at, for example, the irrigation application server 260, or elsewhere over one or more networks 205, for example, at a website or database accessible on the Internet. Weather forecast data can include any short term and/or long term weather forecast data relating to the geographic region of the property, for example, temperature forecasts, humidity forecasts, cloud cover forecasts, precipitation forecasts, forecasts of wind speed and direction, barometric pressure forecasts, anticipated heat indices and/or wind chills, forecasted dew points, etc. In some instances, the dynamically programmed water timer 220 can operate the irrigation system based on the received weather forecast data.

For example, based on weather forecast data indicating that is likely to rain in the geographic region of the property within a threshold period of time, e.g., within the next 24 hours, the dynamically programmed water timer 220 can determine not to activate an irrigation system associated with the property, or can determine to delay activating the irrigation system until after it has stopped raining in the geographic region of the property. In another example, based on determining that the forecasted weather in the region of the property will be extremely hot and dry, i.e., with low humidity, over a forecasted period of time, e.g., a forecasted number of days, the dynamically programmed water timer 220 can determine to irrigate the property more, i.e., for a longer period of time, than a typical irrigation schedule would provide.

In some instances, the dynamically programmed water timer 220 can operate an irrigation system associated with a property based on a combination of current weather data, weather forecast data, data indicating scheduled times that the irrigation system is preferably active, environmental sensor data from the property, and/or activity data from the property. For example, based on environmental sensors associated with a property determining that the soil of a property is moist, and based on weather forecast data indicating that rain is likely within a threshold period of time, e.g., within two days, the dynamically programmed water timer 220 can determine not to activate an irrigation system associated with the property despite a current time being a time when the irrigation system is scheduled to irrigate the property. In another example, based on determining that the soil of the property is dry, the dynamically programmed water timer 220 can determine to activate an irrigation system associated with the property during a schedule time, despite weather forecast data indicating that it will likely rain in the geographic region of the property within a threshold period of time, e.g., on the same day. In still another example, based on environmental sensor data indicating that the soil of a property is dry and that the weather forecast does not indicate that it will rain within a threshold period of time, e.g., within two days, the dynamically programmed water timer 220 can determine to activate an irrigation system of the property for an extended period of time, e.g., twice as long as is typically scheduled, and can determine to only suspend the irrigation of the property by the irrigation system in particular areas and only based on detecting activity within those particular areas. For example, the irrigation system can be activated for a period of two hours in lieu of a typical thirty minute scheduled irrigation period based on environmental data and weather forecast data, and the dynamically programmed water timer 220 can determine to only suspend the two hour irrigation period in particular portions of the property grounds based on detecting that users of the property are occupying the particular portions of the property grounds. Based on detecting that the users leave the particular portions of the property grounds, the dynamically programmed water timer 220 can determine to resume and complete the two hour irrigation period in those particular portions of the property grounds.

In some instances, the dynamically programmed water timer 220 can operate an irrigation system associated with a property based on water usage data, energy usage data, and/or operating cost data. For example, an individual associated with the property can specify an amount of water that the irrigation system can use over a predetermined period of time, can specify an amount of energy that the irrigation system can use over a predetermined period of time, or can specify a monetary cost of operating the irrigation system over a predetermined period of time, and the dynamically programmed water timer 220 can operate the system based on the specified amount or amounts. For example, a user can provide an input via a user interface of the dynamically programmed water timer 220 or using one or more mobile devices 240, 250 that specify that the irrigation system associated with their home should use at most 20,000 gallons of water per month. The dynamically programmed water timer 220 can operate the irrigation system associated with the property based on the 20,000 gallon per month water limit; for example, by watering the lawn and garden of the home using an appropriate fraction of the 20,000 gallon limit each time that the irrigation system is activated. In some instances, a user can provide an input that specifies a target monthly operating cost for the irrigation system, for example, a monthly operating cost of $200.00. Based on the operating cost limit input by the user and data identifying water usage costs, sewerage costs, and/or energy usage costs, for example, received from the irrigation application server 260 or a website or database accessible over one or more networks 205, the dynamically programmed water timer 220 can control the irrigation system associated with the property to provide irrigation to the property while complying with the established budget set by the user.

In some implementations, the dynamically programmed water timer 220 can receive information relating to local water usage restrictions and/or energy usage restrictions pertinent to the geographic region of a property, and can operate an irrigation system associated with the property based on the identified restrictions. For example, the dynamically programmed water timer 220 can receive information indicating a temporary water restriction for the geographic region of the property that specified that lawns cannot be watered for more than thirty minutes per day. In some instances, the dynamically programmed water timer 220 can receive the information identifying the water restriction from the water timer control unit 210, from the one or more mobile devices 240, 250, from an irrigation application server 260 over one or more networks 205, and/or from a website or database that is accessible over one or more networks. Based on the water usage restriction information, the dynamically programmed water timer 220 can operate the property's irrigation system to comply with the water restriction. For example, the dynamically programmed water timer 220 can adjust a watering schedule that typically waters a lawn and garden of the property for one hour per day to only water the lawn for one half hour per day. In another example, a water schedule that typically provides irrigation for one hour every other day can be adjusted to provide irrigation for one half hour every day.

Capabilities to detect water usage can enable the control system 200 to identify the presence of a leak or other problem associated with an irrigation system associated with a property. For example, the dynamically programmed water timer 220 can receive information identifying an amount of water used by the irrigation system over a period of time, and based on the identified amount of water, can determine whether it is likely that a leak in the irrigation system exists. For example, the control system can track an average water usage rate, e.g., gallons per hour, used by the irrigation system, and based on determining that the amount of water usage increases, e.g., that the number of gallons per hour used by the irrigation system increases, the control system can determine that a leak in the irrigation system might exist.

In other instances, the control system 200 can determine that a leak may exist based on tracking an amount of water used over extended periods of time, for example, by comparing a total amount of water used by the irrigation system in a particular month to a total amount of water used by the irrigation system in previous months. In some examples, the control system can determine a leak may exist in the irrigation system based on tracking costs of operating the irrigation system, for example, based on determining that the cost of operating the irrigation system drastically increased for a particular month in comparison to past months, or that an average cost per hour of operating the irrigation system has increased. In some instances, an average cost of operating the irrigation system may be normalized based on water usage costs, energy usage costs, and/or sewerage costs, for example, based on a normalization of the price per 1,000 gallons of water that is charged by a water provider. In some instances, such information can be received by the control system using one or more mobile devices 240, 250, or can be received over one or more networks 205, for example, at an irrigation application server 260, a website, or a database that is accessible on the Internet.

In some instances, the dynamically programmed water timer 220 can determine that a leak may exist in an irrigation system associated with a property, and the dynamically programmed water timer 220 can control the irrigation system and monitor the irrigation system to determine a potential location of the leak. For example, based on determining that the irrigation system associated with the property may have a leak, the dynamically programmed water timer 220 can isolate particular portions of the irrigation system, determine water consumption, energy consumption, and/or cost of operation data for the particular portions of the irrigation system, and based on the consumption and/or cost data can determine which portions of the irrigation system may have the leak. For example, the dynamically programmed water timer 220 can individually turn on each sprinkler or group of sprinklers associated with the irrigation system, e.g., a group of sprinklers that are associated with a single water line, can determine a water usage rate for each of the sprinklers or group of sprinklers, and can determine a location of a potential leak based on determining that a particular sprinkler or group of sprinklers demonstrates increased water usage in comparison to the other sprinklers or groups of sprinklers associated with the irrigation system. Based on determining a potential location of a leak, the dynamically programmed water timer 220 can notify a user of the leak and/or of the location of the leak, for example, by outputting an error message at a display of the water timer, or by communicating a message to one or more mobile devices 240, 250 associated with the dynamically programmed water timer 220.

In some implementations, the one or more processes used by the dynamically programmed water timer 220 to control an irrigation system associated with a property can be adaptive and/or updatable processes that are capable of changing over time, e.g., are processes that are capable of machine learning or intelligent updating. For example, based on environmental data, activity data, weather and weather forecast data, water or energy usage data, etc., the dynamically programmed water timer 220 can adapt processes associated with providing irrigation to a property to provide improved irrigation service to the property. For example, the processes can be adapted to provide more effective irrigation, i.e., irrigation that increases the health or physical appearance of a property's grounds such as a lawn and/or garden, or can be adapted to provide more efficient irrigation at the property, i.e., to provide irrigation that maintains the state of the property while reducing irrigation costs, water usage, and/or energy usage.

In some implementations, performing learning and/or intelligent updating of processes used to control an irrigation system can involve updating controller constant values associated with a PID control process, updating a rule set used in controlling the irrigation system, and/or updating code used in controlling the irrigation system. In some instances, the dynamically programmed water timer 220, or another component of the control system 200, can be capable of learning and/or intelligent updating based on performing neural network learning techniques, or based on other computer learning processes.

In some implementations, the monitoring and/or control of an irrigation system associated with a dynamically programmed water timer can be achieved by individuals or users external to the property, for example, by a professional system monitoring service. In some implementations, the external users can control the irrigation system through a connection to the irrigation system and/or the dynamically programmed water timer over the network 205. For example, the water timer control unit 210 can be a broadband or cellular gateway device, and a professional monitoring service, maintenance service, or technician can access information and/or control the operation of the irrigation system through an interface that connects to the dynamically programmed water timer. In some instances, enabling external control or accessing of data related to the irrigation system by individuals other than users of the property can enable performance monitoring or maintenance monitoring of the dynamically programmed water timer and its associated irrigation system.

In some implementations, the dynamically programmed water timer can use information such as irrigation system performance, energy efficiency, maintenance, or other information to detect errors or faults in the irrigation system. Based on detecting an error, the dynamically programmed water timer can report the error, for example, to a professional monitoring service, or other user associated with the property and/or the irrigation system. In some instances, the error can be reported to a display of the dynamically programmed water timer, or can be reported at a web or mobile-based application, for example, based on the data identifying the error being accessible by the mobile devices 240, 250 having connections to the network 205.

For example, a water sprinkler of an irrigation system might report that it has a below average water pressure corresponding to a potential leak in the irrigation system and, in response, the water sprinkler may be turned off. In this case, the dynamically programmed water timer may additionally broadcast an error message to users indicating that the water sprinkler was turned off due to the potential leak. In another example, a fault relating to a water pump in an irrigation system may cause the water pump to run continuously without providing irrigation to a target area of a property. A first error may be reported by the dynamically programmed water timer indicating that a desired level of irrigation in the target area of the property has not been achieved despite the water pump being active. A second error may be reported based on ground water sensors in the target area indicating that the ground water in the target area of the property has not reached a desired level within a sixty minute period, when a typical time to reach the desired level is forty minutes. Still a third error may be reported based on determining that the irrigation system is consuming 2.0 kWh of energy per hour when typical energy consumption levels are 1.0 kWh of energy per hour. Thus, error and fault detection can utilize robust and redundant methods to accurately report errors, and can monitor the irrigation system as opposed to only individual components of the irrigation system.

In some implementations, error messages and other information can be provided at a display of the dynamically programmed water timer. In some implementations, the display can be an electrophoretic ink (E Ink) display, such as those provided by E Ink Corporation, or any other bi-stable, high contrast, low power display. The display can output information relating to the configuration or control of the irrigation system, where integration of the electrophoretic ink display can enable the display to output detailed information while maintaining readability.

In some implementations, the display of the dynamically programmed water timer can be dynamic in that it enables users to determine information that is and is not presented at the display. For example, a user can interact with a display to specify information that can be provided for output at the display. Information not output at the display can be viewable at another interface, such as by accessing a web or mobile-based application at the mobile devices 240, 250. By enabling the end user to customize the display, the display is not burdened with displaying complex graphics or information, since such information would be accessible elsewhere. For example, an exhaustive operating schedule associated with a property's irrigation system may not be output at a display of the dynamically programmed water timer if such information is accessible and more easily viewed using an application on a mobile device 240, 250.

Figure 3:
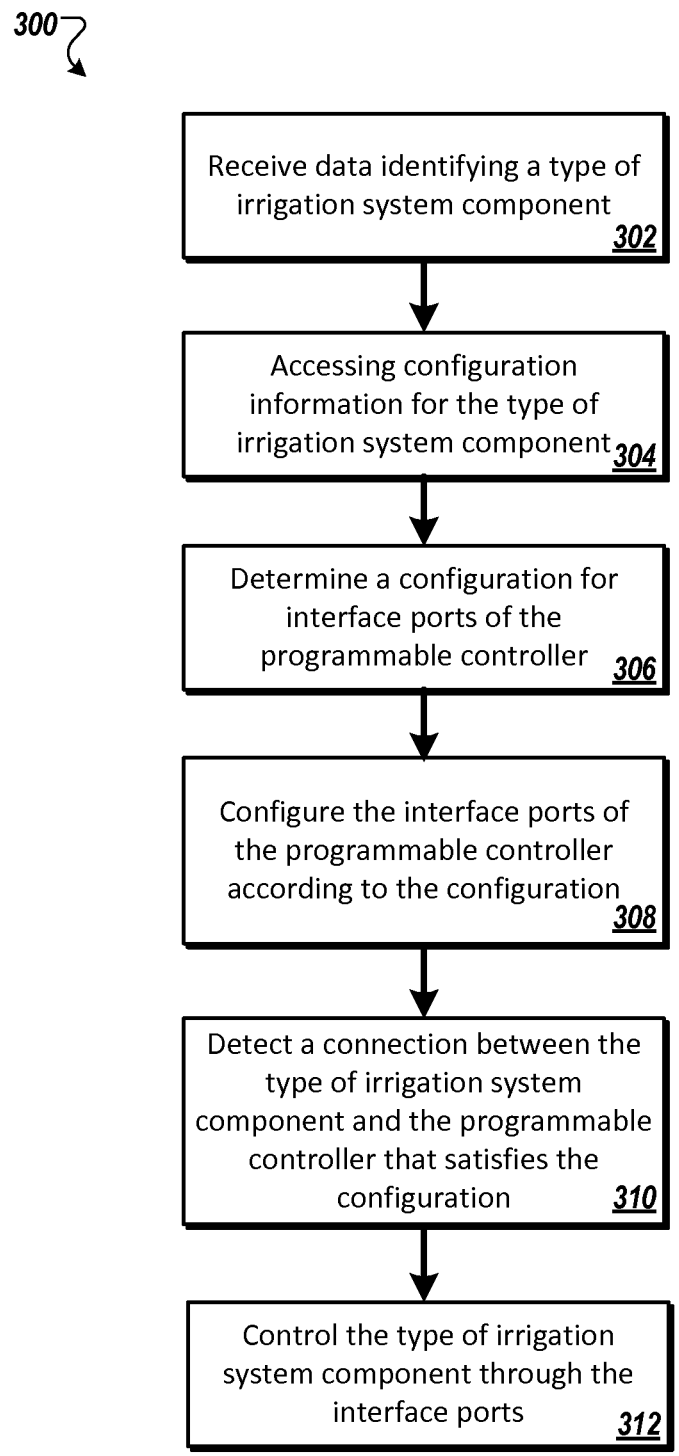
FIG. 3 illustrates a flow chart of an example process.

FIG. 3 illustrates an example process associated with configuring one or more irrigation system components to be controlled by a dynamically programmed water timer. In some implementations, the process 300 of FIG. 3 can be performed by the system 200 of FIG. 2.

Data can be received that identifies a particular type of irrigation system component (302). For example, a dynamically programmed water timer can receive information that identifies a particular type of irrigation system component, such as information identifying a sprinkler, water valve, water pump, hose, etc., and/or other information associated with the irrigation system component, such as a manufacturer, model, skew number, part number, serial number, or other identifier associated with the type of irrigation system component. In some implementations, a particular type of irrigation system component can be a particular irrigation system component unit such that the dynamically programmed water timer receives information identifying a particular identification number, code, or other identifier that is specific to the particular irrigation system component unit.

The information received that identifies the particular type of irrigation system component can be information that is input by a user associated with the irrigation system. For example, a user can input the information identifying the particular type of irrigation system component at an interface associated with the dynamically programmed water timer. In some implementations, the dynamically programmed water timer can detect a connection to one or more particular irrigation system components, and the dynamically programmed water timer can determine a particular type of one or more of the irrigation system components that are connected to the dynamically programmed water timer. For instance, the dynamically programmed water timer can receive and/or exchange information with the one or more irrigation system components, where the information identifies the particular types of one or more of the irrigation system components that are connected to the dynamically programmed water timer. Based on the dynamically programmed water timer detecting that a particular irrigation system component has been connected to the dynamically programmed water timer, the dynamically programmed water timer may request information from the particular irrigation system component that identifies a type of the particular irrigation system component, and the particular irrigation system component can provide information to the dynamically programmed water timer that identifies the type of the particular irrigation system component.

Based on receiving the information identifying the particular type of irrigation system component, configuration information for the particular type of irrigation system component can be accessed (304). For example, based on receiving the information identifying the one or more particular types of irrigation system components, the dynamically programmed water timer can transmit information to an irrigation application server that identifies the particular types of irrigation system components. The irrigation application server can receive the information identifying the one or more particular types of irrigation system components, and can access configuration information for the one or more particular types of irrigation system components. Additionally or alternatively, the dynamically programmed water timer can transmit information identifying the dynamically programmed water timer, such as information identifying a manufacturer, model, or skew number of the dynamically programmed water timer, information identifying capabilities of the dynamically programmed water timer, or other information. The irrigation application server can receive the information from the dynamically programmed water timer and can access configuration information for the irrigation system components and/or the dynamically programmed water timer.

In some implementations, accessing configuration information for a particular type of irrigation system component involves accessing configuration information at a database maintained by the irrigation application server. In addition, the irrigation application server can access the configuration information for a particular type of irrigation system component at another resource that is accessible to the irrigation application server, for example, at one or more databases, web sites, or other resources that are accessible to the irrigation application server over one or more local networks or other networks. Further, the dynamically programmed water timer can access the configuration information directly, for example, without communicating the information identifying one or more particular types of irrigation system components to the irrigation application server. For instance, the dynamically programmed water timer can access the configuration information locally at a database associated and/or maintained by the dynamically programmed water timer, or can access the configuration information at another resource accessible to the dynamically programmed water timer over one or more local networks or other networks.

As described, the accessed configuration information can be information that is usable to install, configure, and/or control the one or more particular types of irrigation system components. For example, the configuration information can be information that specifies an installation procedure, wiring diagram, or other information for installing and configuring a particular type of irrigation system component at a property associated with the irrigation system. Additionally or alternatively, the configuration information can specify one or more control processes, operating parameters, or other information relating to the control of the one or more particular types of irrigation system components by the dynamically programmed water timer.

Based on accessing the configuration information for the one or more particular types of irrigation system components, a configuration for one or more relays or other interface ports of the dynamically programmed water timer can be determined (306). For example, the one or more relays or other interface ports of the dynamically programmed water timer may be reconfigurable relays or interface ports. Based on the configuration information, a configuration for one or more of the relays or other interface ports may be determined that will accommodate the necessary connections between the one or more particular types of irrigation system components and the dynamically programmed water timer.

In some implementations, the irrigation application server can determine the configuration of the one or more relays or other interface ports of the dynamically programmed water timer. For example, based on the irrigation application server receiving information identifying one or more particular types of irrigation system components to be controlled by the dynamically programmed water timer and accessing configuration information for the one or more particular types of irrigation system components, the irrigation application server can determine a configuration for the dynamically programmed water timer and the particular types of irrigation system components that enables the dynamically programmed water timer to control the particular types of irrigation system components. The irrigation application server can determine, based on the determined configuration for the one or more particular types of irrigation system components and the dynamically programmed water timer, a configuration for one or more of the relays or other interface ports of the dynamically programmed water timer, and can provide information specifying the determined configuration to the dynamically programmed water timer. In addition, the dynamically programmed water timer can receive and/or access the configuration information for the one or more particular types of irrigation system components, and can determine a configuration of the one or more relays or other interface ports of the dynamically programmed water timer based on the configuration information. For example, the dynamically programmed water timer can determine a configuration for the irrigation system including the dynamically programmed water timer and the particular types of irrigation system components, and based on determining the configuration for the irrigation system, can determine a configuration for the one or more relays or other interface ports of the dynamically programmed water timer.

One or more relays or other interface ports of the dynamically programmed water timer can be configured based on the determined configuration (308). For example, as described, the one or more relays or other interface ports of the dynamically programmed water timer can be configurable relays or other interface ports, and based on the dynamically programmed water timer receiving and/or determining a configuration for the one or more relays or interface ports, the dynamically programmed water timer can configure the one or more relays or interface ports according to the determined configuration.

A connection between the one or more particular types of irrigation system components and the dynamically programmed water timer can be detected, where the detected connection satisfies the determined configuration for the one or more relays or other interface ports of the dynamically programmed water timer (310). For example, a user associated with the irrigation system can connect the terminals of a particular type of irrigation system component to proper relays or other interface ports of the dynamically programmed water timer, such that the connections between the terminals of the particular type of irrigation system component and the relays or other interface ports of the dynamically programmed water timer satisfies the determined configuration for the one or more relays or other interface ports of the dynamically programmed water timer.

In some implementations, the dynamically programmed water timer may be able to detect a connection to a particular type of irrigation system component and determine that the connection to the particular type of irrigation system component satisfies the determined configuration. For example, the dynamically programmed water timer may exchange information (e.g., a ping, a verification message, etc.) with the particular type of irrigation system component to determine that the connection between the particular type of irrigation system component and the relays or other terminals of the dynamically programmed water timer satisfy the determined configuration. In some implementations, the dynamically programmed water timer may determine that an irrigation system component of an unknown type has been connected to one or more relays or other terminals of the dynamically programmed water timer, and the dynamically programmed water timer can determine, access, or receive information that specifies the type of the connected irrigation system component connected to the dynamically programmed water timer. The dynamically programmed water timer may then confirm that the type of irrigation system component connected to the one or more relays or other terminals of the dynamically programmed water timer corresponds to the type of irrigation system component for which the one or more relays or other interface ports have been configured.

In some examples, the dynamically programmed water timer may detect a connection to an unknown type of irrigation system component that has been connected to one or more relays or other interface ports of the dynamically programmed water timer. The dynamically programmed water timer may detect the connection at a time when the dynamically programmed water timer has not received information identifying a particular type of irrigation system component. Based on detecting the connection, the dynamically programmed water timer may access information or receive information that identifies the particular type of irrigation system component, or may otherwise determine the particular type of irrigation system component. The dynamically programmed water timer may determine a configuration for the one or more relays and/or other interface ports of the dynamically programmed water timer that enables the dynamically programmed water timer to control the particular type of irrigation system component connected to the dynamically programmed water timer. The dynamically programmed water timer may then reconfigure one or more relays or other interface ports to satisfy the determined configuration, such that the connection to the particular type of irrigation system component satisfies the determined configuration.

Based on the connection between the dynamically programmed water timer and the one or more particular types of irrigation system components satisfying the determined configuration, the dynamically programmed water timer can control the one or more particular types of irrigation system components through the one or more relays or other interface ports of the dynamically programmed water timer (312). Controlling a particular type of irrigation system component can involve controlling the particular type of irrigation system component according to one or more control processes, user preferences (e.g., a target saturation for a lawn), policies (e.g., policies that specify a water usage limit or a maximum water cost per month), etc. In some implementations, the dynamically programmed water timer can control the particular type of irrigation system component by transmitting signals to the particular type of irrigation system component that cause the particular type of irrigation system component to turn on or off, that cause the particular type of irrigation system component to be operated at a particular setting (e.g., a particular flow rate of water), that cause the particular type of irrigation system component to be operated for a specific period of time (e.g., that the irrigation system component should run for a predetermined period of time before turning off), or that otherwise control the particular type of irrigation system component.

In some implementations, the dynamically programmed water timer can determine, receive, and/or access information or feedback from a particular type of irrigation system component, and can control the particular type of irrigation system component based on the information or feedback. For example, the dynamically programmed water timer can receive information that indicates the usage of a resource, such as the energy consumption or water consumption, by the particular type of irrigation system component. The dynamically programmed water timer can control the particular type of irrigation system component based on the information. For example, based on receiving information indicating that the water consumption or energy consumption of the particular type of irrigation system component is above a threshold level (e.g., a level indicated by a resource consumption policy) or is trending to exceed the threshold level, the dynamically programmed water timer may control the particular type of irrigation system component by turning off the particular type of irrigation system component, or by reducing the operation of the particular type of irrigation system component (e.g., the amount of time that the particular type of irrigation system component is configured to operate or a water flow rate used by the particular type of irrigation system component).

In some implementations, the dynamically programmed water timer can provide information for display to users of a property associated with the irrigation system, or can transmit information over one or more networks to other users associated with the property or the irrigation system. For example, based on determining (e.g., from information and/or feedback) that one or more particular types of irrigation system components are malfunctioning, the dynamically programmed water timer can provide information for display or transmit, over one or more networks, an error message identifying the malfunction. For instance, a particular sprinkler associated with the irrigation system may be consuming more water or energy than is typical despite the control process for the sprinkler not being altered, and the dynamically programmed water timer may therefore determine that the sprinkler is likely malfunctioning. In response to the determination, the dynamically programmed water timer can display information at an interface associated with the dynamically programmed water timer that includes an error message relating to the malfunctioning sprinkler. Similarly, the dynamically programmed water timer can transmit information to one or more users associated with the property, for example, by transmitting an error message to the client devices of one or more users of the property, or can transmit information to one or more other users associated with the irrigation system, for example, by transmitting an error message to a professional irrigation system monitoring service.

Figure 4A:
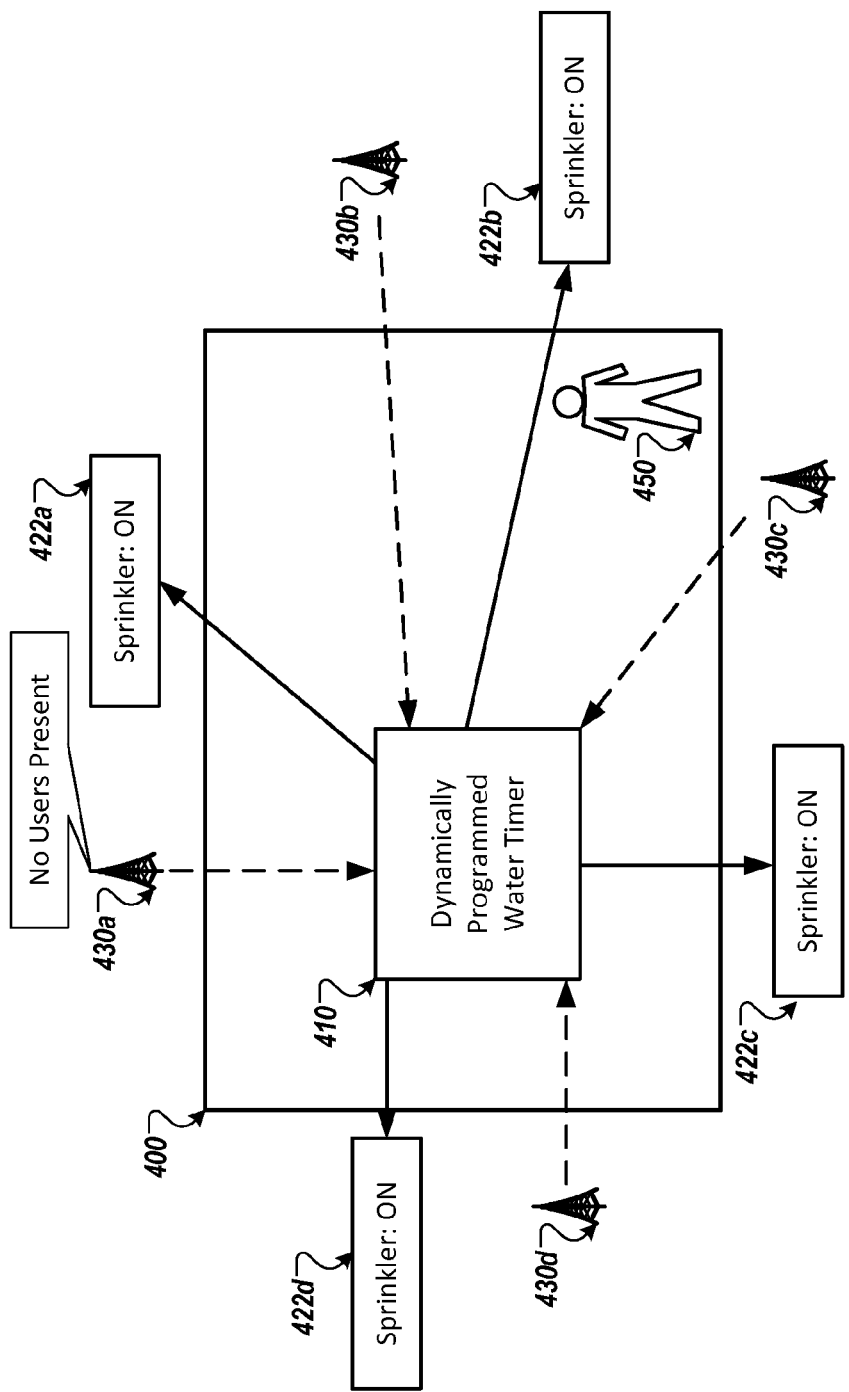
FIGS. 4A-4B illustrate an example of controlling an irrigation system associated with a property based on activity data obtained from the property.
Figure 4B:
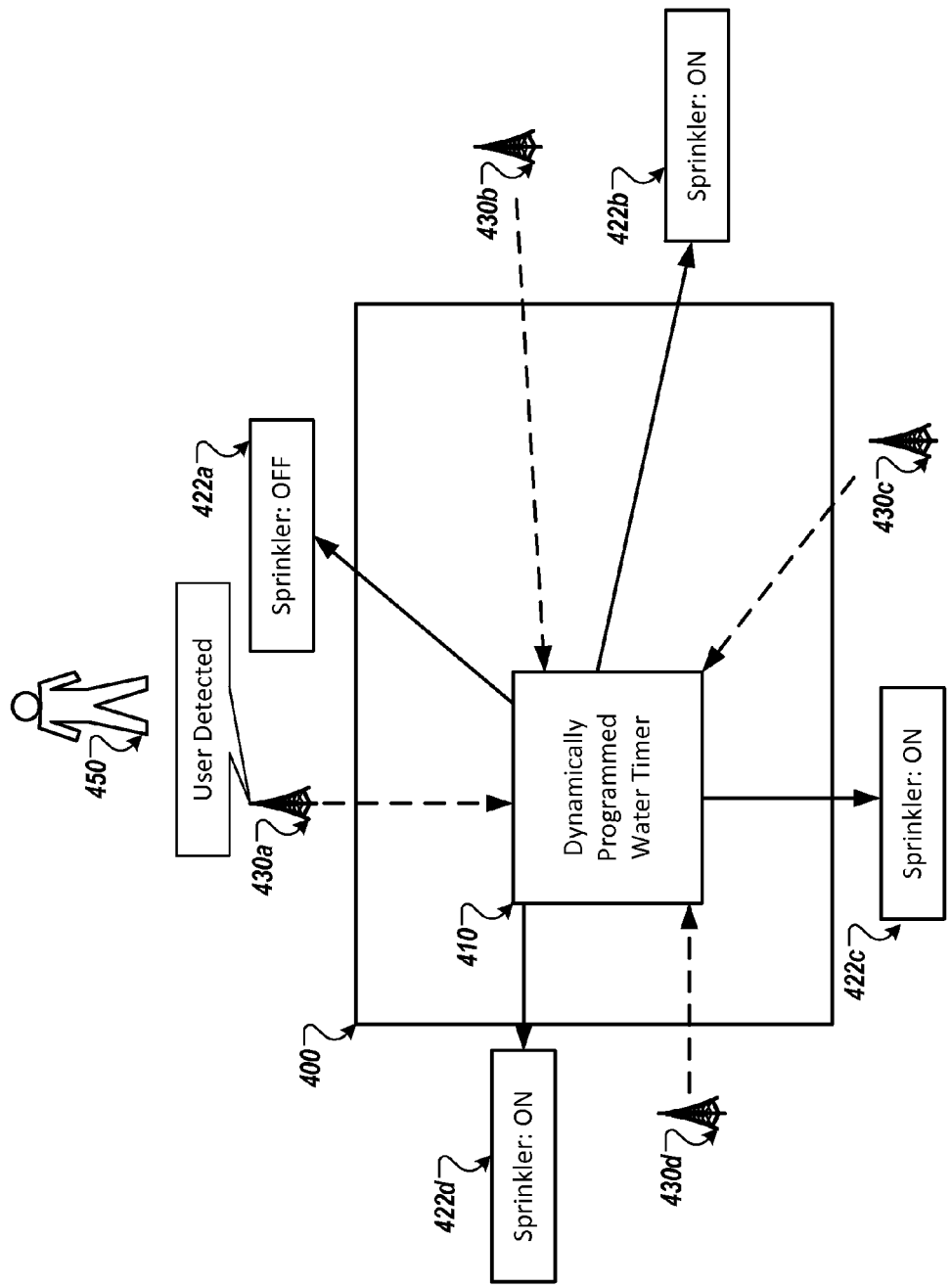

FIGS. 4A and 4B illustrate an example in which an irrigation system associated with a property is controlled using a dynamically programmed water timer, and where control of the irrigation system is determined based at least on user activity data obtained from the property. For example, a property 400 may be associated with an irrigation system that includes a dynamically programmed water timer 410 and one or more irrigation system components. The irrigation system may further be associated or in communication with one or more sensors 430a-430d that are capable of sensing conditions relevant to the presence of one or more users that are near the sensors 430a-430d.

For example, each of the sensors 430a-430d may be associated with a monitoring system associated with the property 400, such that the dynamically programmed water timer 410 may be able to communicate with (e.g., receive sensory data from) the sensors 430a-430d. A sensor 430a-430d may be associated with a particular location or zone of the property 400, such that the sensor 430a-430d may detect the presence of one or more users near the particular location or within the particular zone of the property 400. Additionally, each of the irrigation system components 422a-422d may be associated with a particular location or zone of the property 400, such that the dynamically programmed water timer 410 is aware of the location or zone associated with each of the irrigation system components 422a-422d. The dynamically programmed water timer 410 may be able to receive information from the one or more sensors 430a-430d that indicates whether one or more users are detected as being present near a particular location or within a particular zone associated with the sensors 430a-430d. The dynamically programmed water timer 410 may control the irrigation system components 422a-422d based at least on the data received from the sensors 430a-430d. For instance, the dynamically programmed water timer 410 may be able to turn on or turn off an irrigation system component 422a-422d associated with a particular location or zone of the property 400 based on receiving information from a sensor 430a-430d associated with the same location or zone of the property 400 that indicates whether one or more users are located near or within the location or zone associated with the irrigation system component 422a-422d.

In the scenario shown in FIG. 4A, for example, a user 450 associated with the property 400 is located inside of a building associated with the property 400, for example, inside of an office building, home, retail space, or other residential or commercial building. Additionally, property 400 of FIG. 4A is associated with a set of irrigation system components, which are specifically the sprinklers 422a-422b. The dynamically programmed water timer 410 can receive information from the one or more sensors 430a-430b associated with a monitoring system of the property 400 that are in communication with the dynamically programmed water timer 410, where the received information indicates that none of the sensors 430a-430d have detected the presence of users nearby (e.g., near the locations of the sensors 430a-430d or within the zones of the property 400 associated with the sensors 430a-430d). In response to determining that users are not present outside on the grounds of the property 400, the dynamically programmed water timer 410 may provide instructions to the sprinklers 422a-422d to control the sprinklers 422a-422d. For example, the dynamically programmed water timer 410 may transmit information to the sprinklers 422a-422d (or to controllers associated with the sprinklers 422a-422d) that causes each of the sprinklers 422a-422d to turn on. In some examples, determining to turn on the sprinklers 422a-422d can be based on a number of factors in addition to the user activity data. For example, the dynamically programmed water timer 410 may consider a schedule for the operation of the irrigation system, the weather or a weather forecast for a region corresponding to the property 400, user input commands provided to the dynamically programmed water timer 410, or may consider other information when determining whether to turn on one or more of the sprinklers 422a-422d.

In the scenario shown in FIG. 4B, the user 450 is now located at a location outside of the building associated with the property 400. For example, the user 450 may be located at a particular location or within a particular zone of a yard associated with the property 400. The dynamically programmed water timer 410 may receive information from each of the one or more sensors 422a-422d that indicates whether one or more users 450 have been detected at a location or within a zone associated with each of the sensors 422a-422d. For example, the dynamically programmed water timer 410 may receive information from the sensor 422a that indicates that the user 450 has been detected near the sensor 422a, and may additionally receive information from the sensors 422b-422d that indicates that users have not been detected near those sensors 422b-422d. The dynamically programmed water timer 410 can control one or more of the sprinklers 430a-430d based on the information received from the sensors 422a-422d. For example, the dynamically programmed water timer 410 can control the sprinklers 430a-430d by turning off the sprinkler 430a, and turning on (or determining not to turn off) the sprinklers 430b-430d. As discussed, in some implementations, control of the sprinklers 430a-430d based on the activity of one or more users at the property 400 may further require the dynamically programmed water timer 410 to consider other factors. For example, the dynamically programmed water timer 410 may control the sprinklers 430a-430d based on a combination of activity data for one or more users of the property 400, an activity model for the property and/or users of the property 400, based on environmental condition data and/or weather forecast data for a location of the property 400 or a region near the property 400, based on a schedule or policy associated with the operation of the irrigation system associated with the property 400, and/or based on other data.

For example, in some implementations, the dynamically programmed water timer 410 may consider both activity data that indicates the locations of one or more users at the property 400 and an activity profile associated with the property 400 and/or one or more users of the property 400. For instance, the dynamically programmed water timer 410 may access activity data indicating that none of the users of the property 400 are located at the property 400, and may also access an activity model for the property 400 that indicates that one or more users of the property typically arrive at the property 400 within the next fifteen minutes and typically stay outside of a building of the property 400 when they arrive. Based on the activity data and the activity model for the property 400, the dynamically programmed water timer 410 may determine not to activate one or more of the sprinklers 430a-430d associated with the property 400 for a period of only fifteen minutes before likely having to deactivate the sprinklers 430a-430d when one or more users arrive at the property 400. Based on this determination, the dynamically programmed water timer 410 may forgo turning on the sprinklers 430a-430d associated with the property 400. In some implementations, determining to activate or deactivate one or more sprinklers 430a-430d may be in opposition to a schedule for the irrigation system associated with the property 400. For example, the schedule associated with the irrigation system may indicate that the one or more sprinklers 430a-430d are due to turn on, and based on the user activity data indicating the one or more users are outside at the property 400, the dynamically programmed water timer 410 may override this schedule and forgo activating the sprinklers 430a-430d. In another example, determining to forgo activating one or more sprinklers 430a-430d due to the presence of one or more users outside at the property 400 may be in opposition to environmental condition data that indicates that the soil at the property 400 is dry and requires watering. As discussed, the dynamically programmed water timer 410 may consider other factors in addition to, or in lieu of, user activity data when controlling one or more irrigation system components.

Figure 5:
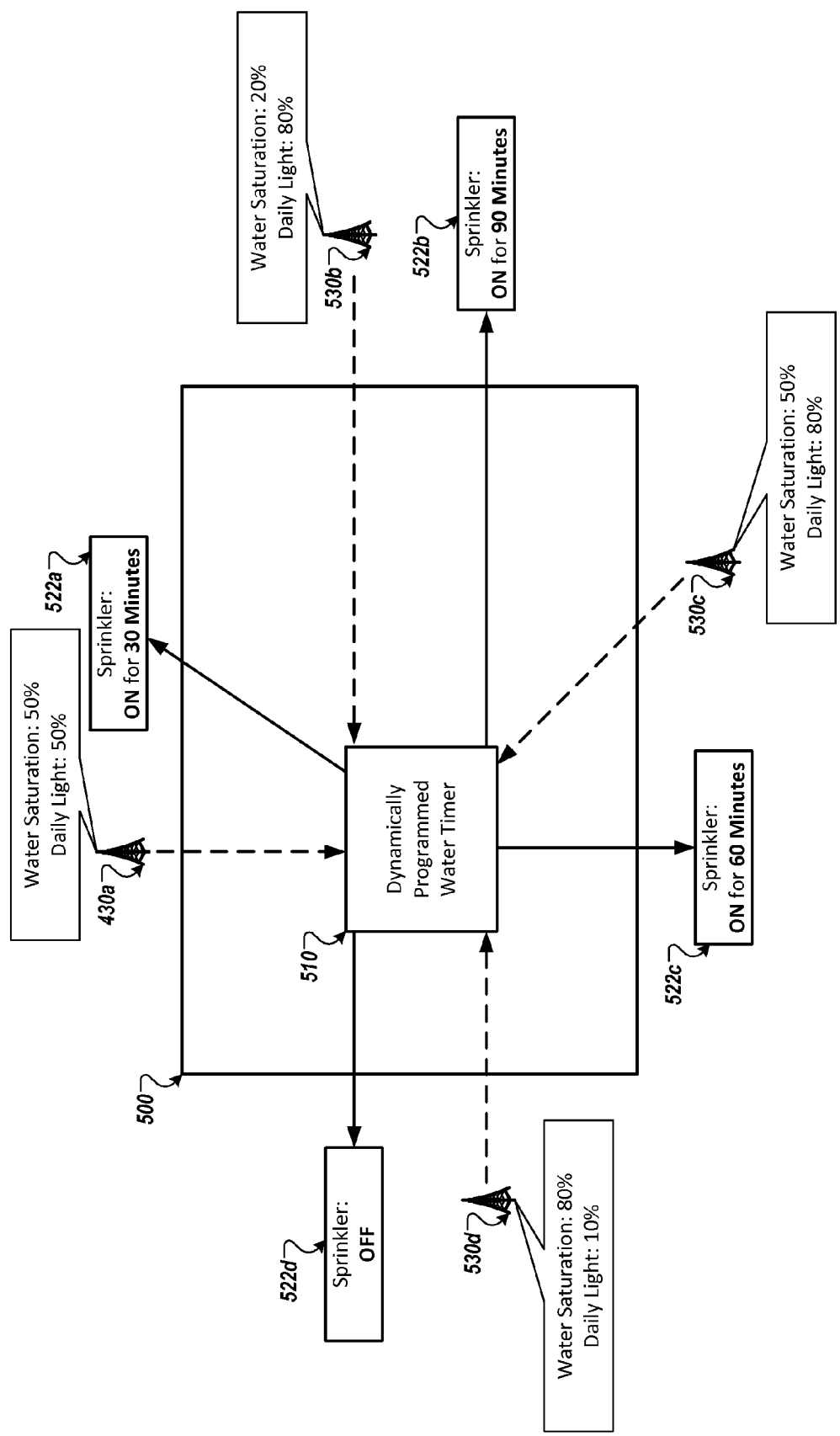
FIG. 5 illustrates an example of controlling an irrigation system associated with a property based on environmental control data.

FIG. 5 illustrates an example in which an irrigation system associated with a property is controlled by a dynamically programmed water timer based at least on environmental control data. For example, a property 500 may be associated with a dynamically programmed water timer 510 and one or more irrigation system components 522a-522d. The dynamically programmed water timer 510 may additionally be associated or in communication with one or more environmental condition sensors 530a-530d. As described, the environmental condition sensors 530a-530d may include one or more temperature sensors, humidity sensors, water saturation sensors, wind sensors, light sensors, air quality sensors, or other sensors capable of detecting a condition of one or more environmental parameters at the locations of the sensors. In some implementations, the sensors 530a-530d may be associated with a monitoring system that is associated with the property 500, such that the monitoring system can perform other operations related to monitoring the property 500. In such an implementation, the dynamically programmed water timer 510 can receive environmental condition information from the environmental condition sensors 530a-530d, for example, by receiving the environmental condition information over one or more connections between the environmental condition sensors 530a-530d, over one or more local networks or other networks, or using one or more other methods. In some implementations, the one or more environmental condition sensors 530a-530d can be a part of the irrigation system associated with the property 500. The dynamically programmed water timer 510 can control the one or more irrigation system components 522a-522d based at least on information received from the environmental condition sensors 530a-530d. Additionally, each of the environmental condition sensors 530a-530d and irrigation system components 522a-522d can be associated with a particular location or zone of the property 500, such that the dynamically programmed water timer 510 can determine the environmental conditions in a particular location or zone of the property 500 and, in response to determining the environmental conditions at the particular location or zone, can control an irrigation system component 522a-522d associated with the particular location or zone of the property 500.

As shown in FIG. 5, for example, the environmental condition sensors 530a-530d are capable of detecting a soil water saturation level at the locations of the environmental condition sensors 530a-530d (e.g., the soil water saturation level relative to fully saturated soil), and are also capable of detecting a relative amount of sunlight at the locations of the environmental condition sensors 530a-530d (e.g., a percentage of total daylight that a particular location or zone receives). As shown in FIG. 5, each of the irrigation system components 522a-522d is a sprinkler. The dynamically programmed water timer 510 can receive environmental condition data obtained by the environmental condition sensors 530a-530d, and can determine operation of the sprinklers 522a-522d based on the received environmental condition data. For example, the dynamically programmed water timer 510 can determine a length of time that each of the sprinklers 522a-522d should be active during a given week based on the received environmental condition data.

As shown in FIG. 5, for instance, the environmental condition sensor 530a associated with a first location or zone of the property 500 may determine that the soil at the location of the environmental condition sensor 530a is 50% saturated, and that the location associated with the environmental condition sensor 530a receiving 50% of daily sunlight. Based on receiving this information from the environmental condition sensor 530a, the dynamically programmed water timer 510 can determine that the location of the property 500 where the environmental condition sensor 530a requires moderate watering, and can therefore control the sprinkler 522a to activate the sprinkler 522a for thirty minutes per week. Similarly, the dynamically programmed water timer 510 can receive information from the environmental condition sensor 530b indicating that the soil at the location of the environmental condition sensor 530b is 20% saturated and receives 80% of daily sunlight. Based on this information, the dynamically programmed water timer 510 can determine that the location of the property 500 associated with the environmental condition sensor 530b requires considerable watering, and can therefore control the sprinkler 522b to activate the sprinkler 522b for ninety minutes per week. The dynamically programmed water timer 510 can receive information from the environmental condition sensor 530c indicating that the soil at the location of the environmental condition sensor 530c is 50% saturated and receives 80% of daily sunlight. Based on the received information, the dynamically programmed water timer 510 can determine that the location of the property 500 associated with the environmental condition sensor 530c requires considerable watering, and can therefore control the sprinkler 522c to activate the sprinkler 522c for sixty minutes per week. Lastly, the dynamically programmed water timer 510 can receive information from the environmental condition sensor 530d that indicates that the soil at the location of the environmental condition sensor 530d is 80% saturated and receives 10% of daily sunlight. Based on this information, the dynamically programmed water timer 510 can determine that the location of the property 500 associated with the environmental condition sensor 530d is overly saturated, and can therefore control the sprinkler 522d to deactivate, or not to activate.

In some implementations, the dynamically programmed water timer 510 can consider other information in addition to the environmental condition data when determining the control of the one or more sprinklers 522a-522d. For example, the dynamically programmed water timer 510 may consider user activity information, an activity profile for the property 500 and/or one or more users of the property 500, weather forecast data for the location of the property 500 or a region corresponding to the location of the property 500, a schedule associated with the control of the irrigation system associated with the property 500, or other information. For example, based on determining that the zone of the property near the environmental condition sensor 530b requires ninety minutes of watering per week, but that a weather forecast for a region corresponding to the location of the property 500 indicates that it is likely to rain within the next two days, the dynamically programmed water timer 510 may determine to only control the sprinkler 522b by activating the sprinkler 522b for sixty minutes per week instead of ninety minutes per week.

The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A programmable controller associated with an irrigation system for a property, the programmable controller comprising:

interface ports that are configurable in multiple settings that relate to multiple, different types of irrigation system components;

at least one processor; and at least one computer-readable storage medium coupled to the at least one processor having stored thereon instructions which, when executed by the at least one processor, cause the at least one process to perform operations comprising:

receiving data identifying a particular type of irrigation system component that is to be controlled by the programmable controller, wherein the data identifying the particular type of irrigation system component is received based on input from a user of the property that specifies the particular type of irrigation system component that is to be controlled by the programmable controller, or is received from the particular type of irrigation system component based on detecting a connection between one or more interface ports of the programmable controller and the particular type of irrigation system component;

based on receiving the data identifying the particular type of irrigation system component, accessing configuration information for the particular type of irrigation system component;

determining a configuration for one or more of the interface ports of the programmable controller based on the configuration information for the particular type of irrigation system component;

configuring the one or more of the interface ports of the programmable controller according to the determined configuration;

detecting a connection between the particular type of irrigation system component and the programmable controller that satisfies the determined configuration; and based on detecting the connection between the particular type of irrigation system component and the programmable controller that satisfies the determined configuration, controlling the particular type of irrigation system component through the one or more of the interface ports.

2. The programmable controller of claim 1, wherein the operations comprise:
receiving data associated with an irrigation schedule for the property, the irrigation schedule specifying times when the particular type of irrigation system component is set to be active and being usable by the programmable controller to determine when to activate the particular type of irrigation system component;
accessing weather forecast data for a geographical region that corresponds to a location of the property;
analyzing the weather forecast data for the geographical region that corresponds to the location of the property with respect to the received irrigation schedule;
based on the analysis of the weather forecast data for the geographical region that corresponds to the location of the property with respect to the received irrigation schedule, determining whether to activate the particular type of irrigation system component; and
based on the determination, controlling the particular type of irrigation system component through the one or more interface ports.

3. The programmable controller of claim 1, wherein the operations comprise:
receiving data associated with an irrigation schedule for the property, the irrigation schedule specifying times when the irrigation system is set to be active and being usable by the programmable controller to determine when to activate the irrigation system;
receiving environmental condition data obtained by one or more sensors associated with the programmable controller, the one or more sensors including sensors that are fixed at the property and that are capable of sensing environmental conditions relevant to the irrigation of the property;
analyzing the environmental condition data with respect to the received irrigation schedule;
based on the analysis of the environmental condition data with respect to the received irrigation schedule, determining whether to activate the particular type of irrigation system component; and
based on the determination, controlling the particular type of irrigation system component through the one or more interface ports.

4. The programmable controller of claim 1, wherein the operations comprise:
receiving data associated with a resource usage policy associated with the property, the resource usage policy indicating limits for the usage of one or more resources that are consumed by the particular type of irrigation system component;
determining, based on the resource usage policy associated with the property, an irrigation schedule for the property, the irrigation schedule specifying times when the irrigation system is set to be active and being usable by the programmable controller to determine when to activate the irrigation system; and
controlling the particular type of irrigation system component through the one or more interface ports according to the determined irrigation schedule for the property.

5. The programmable controller of claim 1, wherein the operations comprise:
accessing information specifying an anticipated usage of a particular resource by the particular type of irrigation system component, wherein the particular resource is a resource that is consumed by the particular type of irrigation system component when the particular type of irrigation system component is active;
monitoring, by the programmable controller, usage of the particular resource by the particular type of irrigation system component;
detecting, based on the monitoring of the usage of the particular resource by the particular type of irrigation system component, that the usage of the particular resource by the particular type of irrigation system component exceeds the anticipated usage of the particular resource by the particular type of irrigation system component;
determining, based on detecting that the usage of the particular resource by the particular type of irrigation system component exceeds the anticipated usage of the particular resource by the particular type of irrigation system component, that the particular type of irrigation system component has experienced an error; and
based on the determination, transmitting, to one or more recipients, data that indicates that the particular type of irrigation system component has experienced an error.

6. The programmable controller of claim 1, wherein the particular type of irrigation system component is associated with a particular location at the property, and wherein the operations comprise:
receiving sensor data from a monitoring system associated with the programmable controller, the monitoring system including sensors that are fixed at the property and that are capable of sensing conditions relevant to the presence of users at various locations at the property;
identifying a location of one or more users at the property based on the sensor data;
determining that the identified location of the one or more users of the at the property corresponds to the particular location at the property associated with the particular type of irrigation system component; and
based on determining that the identified location of the one or more users at the property corresponds to the particular location at the property associated with the particular type of irrigation system component, controlling the particular type of irrigation system component through the one or more interface ports to deactivate the particular type of irrigation system component.

7. The programmable controller of claim 1, wherein the operations comprise:
monitoring a location of a mobile device of the user of the property;
determining, based on the monitoring of the location of the mobile device of the user of the property, to deactivate the particular type of irrigation system component; and
based on determining to deactivate the particular type of irrigation system component, controlling the particular type of irrigation system component through the one or more interface ports to deactivate the particular type of irrigation system component.

8. The programmable controller of claim 1, wherein the particular type of irrigation system component is associated with a particular location at the property, and wherein the operations comprise:

receiving sensor data from sensors that are fixed at the property and that are capable of sensing conditions relevant to the presence of users at various locations at the property over time;

determining, based on the sensor data, locations of one or more users at the property over time;

determining an activity model for the property based at least on the determined locations of the one or more users at the property over time;

determining a current time at the property;

determining, based on the activity model for the property and the current time at the property, one or more locations at the property where users are likely located at the current time;

determining that the location at the property associated with the particular type of irrigation system component does not correspond to the any of the one or more locations at the property where users are likely located at the current time; and based on determining that the location at the property associated with the particular type of irrigation system component does not correspond to any of the one or more locations at the property where users are likely located at the current time, controlling the particular type of irrigation system component through the one or more interface ports to activate the particular type of irrigation system component.

9. The programmable controller of claim 1:

wherein accessing the configuration information for the particular type of irrigation system component comprises accessing information that specifies a wiring arrangement used to enable the programmable controller to control the particular type of irrigation system component; and wherein determining the configuration for the one or more of the interface ports of the programmable controller based on the configuration information for the particular type of irrigation system component comprises determining a configuration for the one or more of the interface ports of the programmable controller that is compatible with the wiring arrangement used to enable the programmable controller to control the particular type of irrigation system component.

10. A method comprising:

receiving data identifying a particular type of irrigation system component that is to be controlled by a programmable controller associated with an irrigation system for a property, wherein the data identifying the particular type of irrigation system component is received based on input from a user of the property that specifies the particular type of irrigation system component that is to be controlled by the programmable controller, or is received from the particular type of irrigation system component based on detecting a connection between one or more interface ports of the programmable controller and the particular type of irrigation system component;

based on receiving the data identifying the particular type of irrigation system component, accessing configuration information for the particular type of irrigation system component;

determining a configuration for one or more of the interface ports of the programmable controller based on the configuration information for the particular type of irrigation system component;

configuring the one or more of the interface ports of the programmable controller according to the determined configuration;

detecting a connection between the particular type of irrigation system component and the programmable controller that satisfies the determined configuration; and based on detecting the connection between the particular type of irrigation system component and the programmable controller that satisfies the determined configuration, controlling the particular type of irrigation system component through the one or more of the interface ports.

11. The method of claim 10, comprising:

receiving data associated with an irrigation schedule for the property, the irrigation schedule specifying times when the particular type of irrigation system component is set to be active and being usable by the programmable controller to determine when to activate the particular type of irrigation system component;

accessing weather forecast data for a geographical region that corresponds to a location of the property;

analyzing the weather forecast data for the geographical region that corresponds to the location of the property with respect to the received irrigation schedule;

based on the analysis of the weather forecast data for the geographical region that corresponds to the location of the property with respect to the received irrigation schedule, determining whether to activate the particular type of irrigation system component; and based on the determination, controlling the particular type of irrigation system component through the one or more interface ports.

12. The method of claim 10, comprising:

receiving data associated with an irrigation schedule for the property, the irrigation schedule specifying times when the irrigation system is set to be active and being usable by the programmable controller to determine when to activate the irrigation system;

receiving environmental condition data obtained by one or more sensors associated with the programmable controller, the one or more sensors including sensors that are fixed at the property and that are capable of sensing environmental conditions relevant to the irrigation of the property;

analyzing the environmental condition data with respect to the received irrigation schedule;

based on the analysis of the environmental condition data with respect to the received irrigation schedule, determining whether to activate the particular type of irrigation system component; and based on the determination, controlling the particular type of irrigation system component through the one or more interface ports.

13. The method of claim 10, comprising:

receiving data associated with a resource usage policy associated with the property, the resource usage policy indicating limits for the usage of one or more resources that are consumed by the particular type of irrigation system component;

determining, based on the resource usage policy associated with the property, an irrigation schedule for the property, the irrigation schedule specifying times when the irrigation system is set to be active and being usable by the programmable controller to determine when to activate the irrigation system; and controlling the particular type of irrigation system component through the one or more interface ports according to the determined irrigation schedule for the property.

14. The method of claim 10, comprising:
accessing information specifying an anticipated usage of a particular resource by the particular type of irrigation system component, wherein the particular resource is a resource that is consumed by the particular type of irrigation system component when the particular type of irrigation system component is active;
monitoring, by the programmable controller, usage of the particular resource by the particular type of irrigation system component;
detecting, based on the monitoring of the usage of the particular resource by the particular type of irrigation system component, that the usage of the particular resource by the particular type of irrigation system component exceeds the anticipated usage of the particular resource by the particular type of irrigation system component;
determining, based on detecting that the usage of the particular resource by the particular type of irrigation system component exceeds the anticipated usage of the particular resource by the particular type of irrigation system component, that the particular type of irrigation system component has experienced an error; and
based on the determination, transmitting, to one or more recipients, data that indicates that the particular type of irrigation system component has experienced an error.

15. The method of claim 10, wherein the particular type of irrigation system component is associated with a particular location at the property, and comprising:
receiving sensor data from a monitoring system associated with the programmable controller, the monitoring system including sensors that are fixed at the property and that are capable of sensing conditions relevant to the presence of users at various locations at the property;
identifying a location of one or more users at the property based on the sensor data;
determining that the identified location of the one or more users at the property corresponds to the particular location at the property associated with the particular type of irrigation system component; and
based on determining that the identified location of the one or more users at the property corresponds to the particular location at the property associated with the particular type of irrigation system component, controlling the particular type of irrigation system component through the one or more interface ports to deactivate the particular type of irrigation system component.

16. The method of claim 10, comprising:
monitoring a location of a mobile device of the user of the property;
determining, based on the monitoring of the location of the mobile device of the user of the property, to deactivate the particular type of irrigation system component; and
based on determining to deactivate the particular type of irrigation system component, controlling the particular type of irrigation system component through the one or more interface ports to deactivate the particular type of irrigation system component.

17. The method of claim 10, wherein the particular type of irrigation system component is associated with a particular location at the property, and comprising:
receiving sensor data from sensors that are fixed at the property and that are capable of sensing conditions relevant to the presence of users at various locations at the property over time;
determining, based on the sensor data, locations of one or more users at the property over time;
determining an activity model for the property based at least on the determined locations of the one or more users at the property over time;
determining a current time at the property;
determining, based on the activity model for the property and the current time at the property, one or more locations at the property where users are likely located at the current time;
determining that the location at the property associated with the particular type of irrigation system component does not correspond to the any of the one or more locations at the property where users are likely located at the current time; and
based on determining that the location at the property associated with the particular type of irrigation system component does not correspond to any of the one or more locations at the property where users are likely located at the current time, controlling the particular type of irrigation system component through the one or more interface ports to activate the particular type of irrigation system component.

18. The method of claim 10:
wherein accessing the configuration information for the particular type of irrigation system component comprises accessing information that specifies a wiring arrangement used to enable the programmable controller to control the particular type of irrigation system component; and
wherein determining the configuration for the one or more of the interface ports of the programmable controller based on the configuration information for the particular type of irrigation system component comprises determining a configuration for the one or more of the interface ports of the programmable controller that is compatible with the wiring arrangement used to enable the programmable controller to control the particular type of irrigation system component.

19. A programmable controller associated with an irrigation system for a property, the programmable controller comprising:
interface ports that are configurable in multiple settings that relate to multiple, different types of irrigation system components;
at least one processor; and
at least one computer-readable storage medium coupled to the at least one processor having stored thereon instructions which, when executed by the at least one processor, cause the at least one process to perform operations comprising:
receiving data identifying a particular type of irrigation system component that is to be controlled by the programmable controller;
based on receiving the data identifying the particular type of irrigation system component, accessing configuration information for the particular type of irrigation system component that specifies a wiring arrangement used to enable the programmable controller to control the particular type of irrigation system component;

determining, based on the configuration information for the particular type of irrigation system component, a configuration for one or more of the interface ports of the programmable controller that is compatible with the wiring arrangement used to enable the programmable controller to control the particular type of irrigation system component;

configuring the one or more of the interface ports of the programmable controller according to the determined configuration;

detecting a connection between the particular type of irrigation system component and the programmable controller that satisfies the determined configuration; and based on detecting the connection between the particular type of irrigation system component and the programmable controller that satisfies the determined configuration, controlling the particular type of irrigation system component through the one or more of the interface ports.

* * * * *

UNITED STATES PATENT AND TRADEMARK OFFICE
CERTIFICATE OF CORRECTION

PATENT NO. : 9,829,871 B1
APPLICATION NO. : 14/447374
DATED : November 28, 2017
INVENTOR(S) : Daniel Marc Goodman and Craig Carl Heffernan Page 1 of 1

It is certified that error appears in the above-identified patent and that said Letters Patent is hereby corrected as shown below:

In the Specification

In Column 1, Line 8, delete "2014," and insert -- 2013, --, therefor.

In the Claims

In Column 34, Claim 6, Line 39, after "users" delete "of the".

Signed and Sealed this
Twenty-ninth Day of May, 2018

Andrei Iancu
*Director of the United States Patent and Trademark Office*